(12) United States Patent
Yanagawa et al.

(10) Patent No.: US 6,178,288 B1
(45) Date of Patent: *Jan. 23, 2001

(54) REPRODUCTION DEVICE

(75) Inventors: Yoshifumi Yanagawa, Kyoto; Tadashi Kunihira, Osaka, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/727,254

(22) Filed: Oct. 8, 1996

(30) Foreign Application Priority Data

Oct. 13, 1995 (JP) .................................................... 7-265197

(51) Int. Cl.[7] .............................. H04N 5/782; H04N 5/76
(52) U.S. Cl. ............................................. 386/96; 386/124
(58) Field of Search ............................ 386/96, 124, 123, 386/27, 33, 34, 35, 37, 39, 46, 95, 109, 111, 112, 40; H04N 05/782, 5/76

(56) References Cited

FOREIGN PATENT DOCUMENTS

| 0 598 184 A2 | 5/1994 | (EP) . |
|---|---|---|
| 0 601 963 A2 | 6/1994 | (EP) . |
| 0 606 180 A2 | 7/1994 | (EP) . |
| 0 671 855 A2 | 9/1995 | (EP) . |
| 0 718 825 A1 | 6/1996 | (EP) . |
| 08009329 | 1/1996 | (JP) . |
| 08050701 | 2/1996 | (JP) . |
| 08065633 | 3/1996 | (JP) . |
| WO 96/06426 | 2/1996 | (WO) . |

*Primary Examiner*—Robert Chevalier
(74) *Attorney, Agent, or Firm*—Michael K. Kelly; Snell & Wilmer, LLP

(57) ABSTRACT

A reproduction apparatus includes: a signal reading section for reading a signal recorded on a recording medium, the signal including a digital signal and an analog signal; a control signal reading section for reading a control signal recorded on the recording medium and including information representing a time mode indicating a run speed of the recording medium; a first determination section for determining the time mode based on an output of the control signal reading section; and a second determination section for determining whether the signal read by the signal reading section is a digital signal or an analog signal after the time mode is determined by the first determination section.

25 Claims, 23 Drawing Sheets

Track pattern of FM audio signal

Track pattern of digital signal in Example 1

Track pattern of digital signal in Example 3

HSW and CTL in Example 3

REPRODUCTION DEVICE

BACKGROUND OF THE INVENTION

1. Field of the Invention

The present invention relates to a reproduction apparatus, and in particular to a VCR (video cassette recorder) for reproducing a digital signal or an analog signal.

2. Description of the Related Art

In recent years, VCRs for reproducing analog signals (such as VHS-VCRs and 8 mm-VCRs) have been made into commercial products. In addition, VCRs for reproducing digital signals have also been developed. Hereinafter, examples of such conventional reproduction apparatuses are described.

In a conventional reproduction apparatus for reproducing analog signals, a frequency multiplexed video signal recorded on a magnetic tape, which includes an FM (frequency modulated) luminance signal and a low-frequency conversion carrier chrominance signal, is reproduced by a magnetic head and then amplified by a video preamplifier. The output of the video preamplifier is separated into the FM luminance signal and the low-frequency conversion carrier chrominance signal components through a high pass filter and a low pass filter, respectively. A reproduced luminance process circuit subjects the FM luminance signal to a limiter process, a dropout compensation, an FM demodulation process, a de-emphasis, a deviation adjustment, a low-frequency filtering, and a noise cancellation process, thereby obtaining a reproduced luminance signal. On the other hand, a reproduced chrominance process circuit subjects the low-frequency conversion carrier chrominance signal to an AGC (automatic gain control) process, a burst de-emphasis, a frequency high-range conversion, and a color killer process, thereby restoring a reproduced carrier chrominance signal. Then, the reproduced luminance signal and the reproduced carrier chrominance signal are added by an adder so as to be output via an output terminal as a reproduced video signal.

On the other hand, an FM audio signal which is recorded on the magnetic tape by a multi-layer recording method is reproduced by a magnetic head, amplified by an audio preamplifier, and separated into a left FM audio signal and a right FM audio signal through band-pass filters. A reproduced FM audio signal process circuit subjects the left and right FM audio signals to a demodulation process, a dropout compensation, a low-frequency filtering, and a noise reduction process, so as to be output via an output terminal as a reproduced audio signal.

Thus, an analog video signal and an analog audio signal can be reproduced.

In a conventional digital signal reproduction apparatus, a signal recorded on a magnetic tape is reproduced by a magnetic head, amplified by a playback amplifier, and then input to a reproduced digital signal process circuit. The reproduced digital signal process circuit subjects the signal to a playback equalization, an AGC process, a channel decoding, a decoding for error correction codes, and an error correction process, thereby outputting a reproduced digital signal via an output terminal. The reproduced digital signal is, for example, an MPEG (Moving Picture Experts Group) signal which is obtained by compressing video image data and audio data in accordance with the MPEG standards. By processing the signal with an MPEG decoder, video and audio output signals can be obtained.

Thus, a digital signal can be reproduced.

In the field of home-use VCRs, the recording/reproduction of analog signals (e.g., by the VHS method) is currently predominant. However, once digital broadcasting or the like is commenced in the future, it will require a VCR which is capable of recording digital signals. Therefore, by accommodating both the above-mentioned analog signal process circuitry and the above-mentioned digital signal process circuitry, it becomes possible for one VCR to reproduce both analog signals and digital signals. Moreover, for simplifying mechanical components and for improved usefulness, the cassette tape for recording digital signals can be adapted to have substantially the same shape and size as those of the cassette tape for recording analog signals, thereby making it possible to reproduce both analog signals and digital signals from one cassette tape.

However, such conventional reproduction apparatuses typically record or reproduce digital signals and analog signals in a mingled manner in the same (or same kind of) cassette tape. As a result, when reproducing a recorded signal, it is impossible to determine whether a digital signal or an analog signal is recorded, so that it cannot be determined whether to operate the digital signal process circuitry or the analog signal process circuitry of the reproduction apparatus.

SUMMARY OF THE INVENTION

A reproduction apparatus according to the present invention includes: a signal reading section for reading a signal recorded on a recording medium, the signal including a digital signal and an analog signal; a control signal reading section for reading a control signal recorded on the recording medium and including information representing a time mode indicating a run speed of the recording medium; a first determination section for determining the time mode based on an output of the control signal reading section; and a second determination section for determining whether the signal read by the signal reading section is a digital signal or an analog signal after the time mode is determined by the first determination section.

In one embodiment of the invention, the reproduction apparatus further includes an unrecorded mode determination section for determining whether or not the signal is recorded on the recording medium based on the output of the control signal reading section.

In another embodiment of the invention, the second determination section includes a digital signal detection section for outputting a digital signal detection signal when detecting that the signal read by the signal reading section is a digital signal.

In still another embodiment of the invention, the digital signal detection section keeps operating regardless of whether the signal read by the signal reading section is a digital signal or an analog signal.

In still another embodiment of the invention, the second determination section includes an analog signal detection section for outputting an analog signal detection signal when detecting that the signal read by the signal reading section is an analog signal.

In still another embodiment of the invention, the analog signal detection section keeps operating regardless of whether the signal read by the signal reading section is a digital signal or an analog signal.

In still another embodiment of the invention, the second determination section includes: a digital signal detection section for outputting a digital signal detection signal when detecting that the signal read by the signal reading section is a digital signal; and an analog signal detection section for outputting an analog signal detection signal when detecting that the signal read by the signal reading section is an analog signal.

In still another embodiment of the invention, the recording medium includes a digital signal recorded region in which the digital signal is recorded, an analog signal recorded region in which the analog signal is recorded, and an unrecorded region in which the signal is not recorded, the control signal including information representing only one time mode for the digital signal, and the second determination section determines, when a region read by the control signal reading section proceeds from a first region to a second region, whether or not the signal read by the signal reading section is the analog signal based on the control signal read in the second region, the first region being the digital signal recorded region and the second region being different from the first region.

In still another embodiment of the invention, the recording medium includes a digital signal recorded region in which the digital signal is recorded, an analog signal recorded region in which the analog signal is recorded, and an unrecorded region in which the signal is not recorded, the control signal including information representing only one time mode for the analog signal, and the second determination section determines, when a region read by the control signal reading section proceeds from a first region to a second region, whether or not the signal read by the signal reading section is the digital signal based on the control signal read in the second region, the first region being the analog signal recorded region and the second region being different from the first region.

In still another embodiment of the invention, the control signal includes exclusive time mode information indicating a time mode for reproducing either the digital signal or the analog signal; the first determination section outputs the time mode information to the second determination section; and the second determination section determines whether the signal read by the signal reading section is a digital signal or an analog signal based on the exclusive time mode information when the time mode information received from the first determination section is the exclusive time mode information.

In still another embodiment of the invention, the digital signal detection section includes: an error correction code decoding section for decoding an error correction code of the signal read by the signal reading section and outputting an error flag indicating a read error; and an error flag detection section for outputting the digital signal detection signal when detecting that the signal read by the signal reading section is a digital signal according to the error flag.

In still another embodiment of the invention, the digital signal detection section includes: a channel decoding section for decoding the signal read by the signal reading section and outputting a decoded signal; and a synchronization signal detection section for outputting the digital signal detection signal when detecting that the signal read by the signal reading section is a digital signal by detecting a synchronization signal included in the decoded signal.

In still another embodiment of the invention, the analog signal detection section outputs the analog signal detection signal by detecting a level of a reproduction envelope of the signal read by the signal reading section.

In still another embodiment of the invention, the analog signal detection section includes an analog video signal detection section for outputting the analog signal detection signal when detecting that the signal read by the signal reading section is an analog video signal.

In still another embodiment of the invention, the analog video signal detection section outputs the analog signal detection signal by detecting a level of an envelope of the signal read by the signal reading section in the case where the signal is the analog video signal.

In still another embodiment of the invention, the analog signal detection section includes an analog audio signal detection section for outputting the analog signal detection signal when detecting that the signal read by the signal reading section is an analog audio signal.

In still another embodiment of the invention, the analog audio signal detection section outputs the analog signal detection signal by detecting a level of an envelope of the signal read by the signal reading section in the case where the signal is the analog audio signal.

In still another embodiment of the invention, the analog signal includes an analog video signal and an analog audio signal, and the signal reading section includes a first magnetic head for reading the analog video signal, a second magnetic head for reading the analog audio signal, and a third magnetic head for reading the digital signal, the second magnetic head and the third magnetic head being the same magnetic head.

In still another embodiment of the invention, the signal reading section includes a plurality of magnetic heads having different gap widths for reading the signal corresponding to the respective ones of the plurality of time modes, and the second determination section determines whether the signal read by the signal reading section is a digital signal or an analog signal based on the signal which is read by one of the plurality of magnetic heads having the largest gap width.

In still another embodiment of the invention, the recording medium includes a first signal recorded region in which the signal is recorded, an unrecorded region in which the signal is not recorded, and a second signal recorded region, the unrecorded region adjoining the first signal recorded region and the second signal recorded region adjoining the unrecorded region, wherein the reproduction apparatus further includes a reproduction mode memory section for storing a result of reproduction mode determination by the second determination section as to whether the signal read by the signal reading section is a digital signal or an analog signal, the unrecorded mode determination section outputting a result of determination as to whether the signal is recorded on the recording medium to the second determination section. The second determination section stores the result of the reproduction mode determination in the reproduction mode memory section when the signal reading section reads the signal in the first signal recorded region and the result output from the unrecorded mode determination section indicates that the signal is recorded on the recording medium. The second determination section retains without updating the result of the reproduction mode determination stored in the reproduction mode memory section when a region read by the signal reading section proceeds from the first signal recorded region to the unrecorded region and the result output from the unrecorded mode determination section indicates that the signal is not recorded on the recording medium. The second determination section determines whether the signal read from the second signal recorded region is in a reproduction mode identical to the result of the reproduction mode determination stored in the reproduction mode memory section when the region read by the signal reading section proceeds from the unrecorded region to the second signal recorded region and the result output from the unrecorded mode determination section indicates that the signal is recorded on the recording medium.

In still another embodiment of the invention, the recording medium includes a first signal recorded region in which the signal is recorded, an unrecorded region in which the signal is not recorded, and a second signal recorded region, the unrecorded region adjoining the first signal recorded region and the second signal recorded region adjoining the unrecorded region, wherein the reproduction apparatus further includes a time mode memory section for storing a result of the time mode determination by the first determination section, the unrecorded mode determination section outputting the result of determination as to whether the signal is recorded on the recording medium to the first determination section. The first determination section stores the result of the time mode determination in the time mode memory section when the signal reading section reads the signal in the first signal recorded region and the result output from the unrecorded mode determination section indicates that the signal is recorded on the recording medium. The first determination section retains without updating the result of the time mode determination stored in the time mode memory section when a region read by the signal reading section proceeds from the first signal recorded region to the unrecorded region and the result output from the unrecorded mode determination section indicates that the signal is not recorded on the recording medium. The first determination section determines whether the signal read from the second signal recorded region is in a time mode identical to the result of the time mode determination stored in the time mode memory section when the region read by the signal reading section proceeds from the unrecorded region to the second signal recorded region and the result output from the unrecorded mode determination section indicates that the signal is recorded on the recording medium.

Alternatively, the reproduction apparatus according to the present invention includes: a signal reading section for reading a signal recorded in tracks formed on a magnetic tape, the signal including a digital signal and an analog signal; a control signal reading section for reading, simultaneously with the reading of the signal, a control signal recorded on the magnetic tape and including information representing a time mode indicating a run speed of the magnetic tape; an unrecorded mode determination section for determining whether or not the signal is recorded on the magnetic tape based on the output of the control signal reading section; a first determination section for determining the time mode based on an output of the control signal reading section; a second determination section for determining whether the signal read by the signal reading section is a digital signal or an analog signal after the time mode is determined by the first determination section; and a phase control section for controlling the running of the tape so that the signal retains a first phase relationship with the control signal when the signal is a digital signal and that the signal retains a second phase relationship with the control signal when the signal is an analog signal, the second phase relationship being different from the first phase relationship, the phase control section controlling the running of the tape so that the first phase relationship is attained prior to the determination by the second determination section as to whether or not the signal read by the signal reading section is a digital signal, and that the second phase relationship is attained prior to the determination by the second determination section as to whether or not the signal read by the signal reading section is an analog signal.

Alternatively, the reproduction apparatus according to the present invention includes: a signal reading section including a rotation cylinder having a magnetic head thereon for reading a signal recorded on a magnetic tape by scanning tracks obliquely formed on the magnetic tape, the signal including a digital signal and an analog signal; a tape run speed control section for controlling a run speed of the magnetic tape; and a reproduction mode determination section for outputting an instruction to the tape run speed control section for running the magnetic tape at a tape run speed different from predetermined tape run speeds used for reading the digital signal and determining whether the signal read by the signal reading section is a digital signal or an analog signal.

In one embodiment of the invention, the instruction output from the reproduction mode determination section to the tape run speed control section is for running the magnetic tape at a speed twice as high as a highest one of the predetermined tape run speeds used for reading the digital signal.

Alternatively, the reproduction apparatus according to the present invention includes: a signal reading section including a rotation cylinder having a magnetic head thereon for reading a signal recorded on a magnetic tape by scanning tracks obliquely formed on the magnetic tape, the signal including a digital signal and an analog signal; a tape run speed control section for controlling the magnetic tape to run or stop; and a reproduction mode determination section for outputting an instruction to the tape run speed control section for stopping the magnetic tape and determining whether the signal recorded on the magnetic tape is a digital signal or an analog signal based on the signal read by the signal reading section.

Thus, the invention described herein makes possible the advantage of providing a reproduction apparatus capable of quickly and accurately determining during a reproduction operation whether a digital signal or an analog signal is recorded or no signal is recorded on a magnetic tape.

This and other advantages of the present invention will become apparent to those skilled in the art upon reading and understanding the following detailed description with reference to the accompanying figures.

DESCRIPTION OF THE PREFERRED EMBODIMENTS

Example 1

Figure 1:
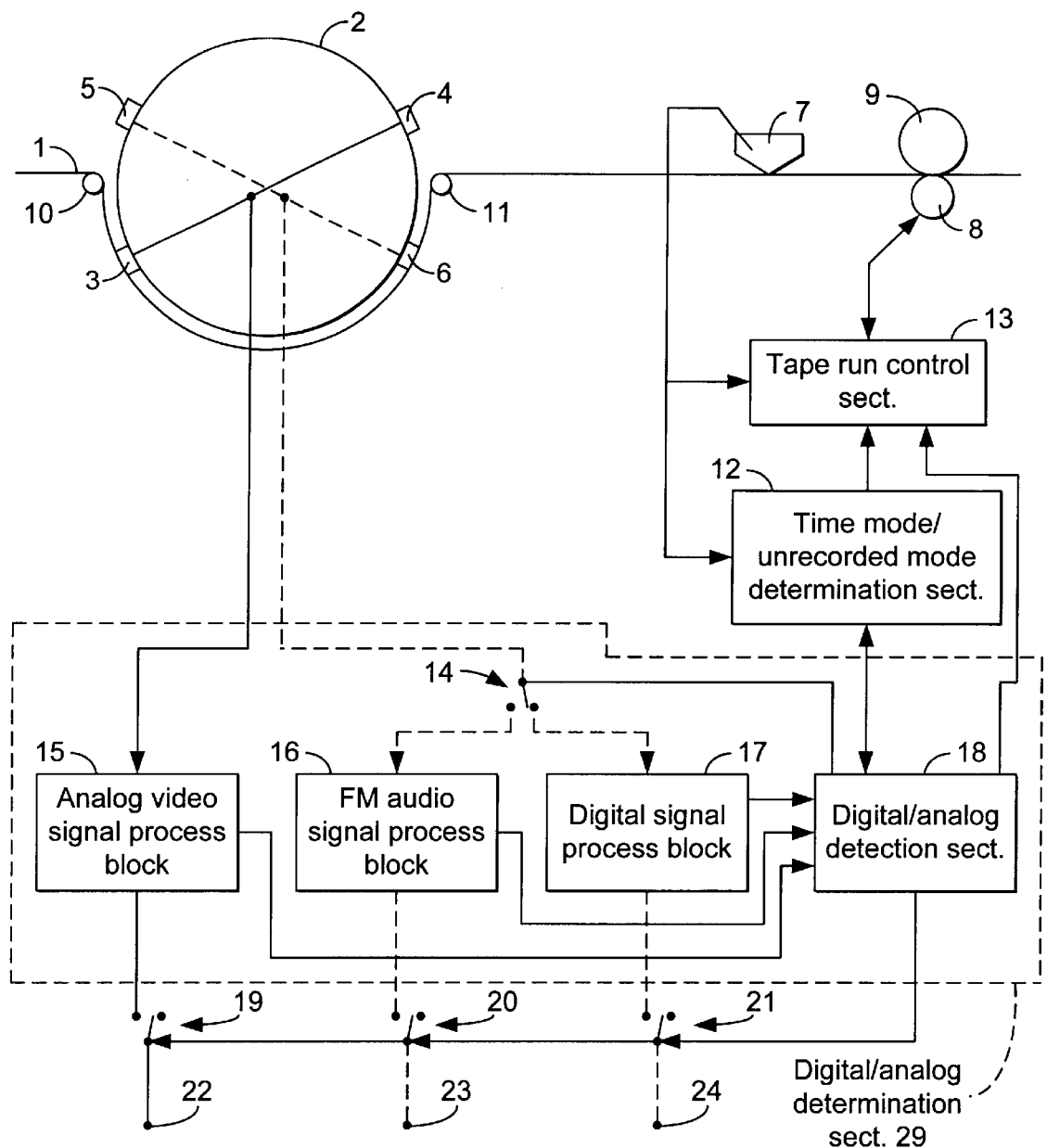
FIG. 1 is a block diagram illustrating a reproduction apparatus according to Example 1 of the present invention.

FIG. 1 is a block diagram illustrating a reproduction apparatus according to Example 1 of the present invention. As shown in FIG. 1, the reproduction apparatus includes: a magnetic tape 1, a rotation cylinder 2, a first magnetic head 3 having an R (right) azimuth angle; a first magnetic head 4 having an L (left) azimuth angle; a second magnetic head 5 having an R (right) azimuth angle; a second magnetic head 5 having an L (left) azimuth angle; a control head 7; a capstan motor 8; a pinch roller 9; a first post 10; a second post 11; a time mode/unrecorded mode determination section 12; a tape run control section 13; a first switch 14; an analog video signal process block 15 for processing and detecting analog video signals; an FM audio signal process block 16 for processing and detecting an analog audio signal; a digital signal process block 17 for processing and detecting a digital signal; a digital/analog detection section 18; a second switch 19; a third switch 20; a fourth switch 21; a video signal output terminal 22; an audio signal output terminal 23; and a digital signal output terminal 24. A digital/analog determination section 29 includes the analog video signal process block 15, the FM audio signal process block 16, the digital signal process block 17, and the digital/analog detection section 18.

The first magnetic heads 3 and 4 are heads for analog video signals (having azimuth angles of ±6°, for example). The second magnetic heads 5 and 6 are heads for an FM audio signal and a digital signal (having azimuth angles of ±30°, for example). The magnetic heads 3, 4, 5 and 6 are provided on the rotation cylinder 2. The magnetic tape 1 is obliquely wound around the rotation cylinder 2 by the use of the first and second posts 10 and 11. The magnetic heads 3, 4, 5 and 6 read signals recorded on the magnetic tape 1 by scanning the tracks which are formed on the magnetic tape 1 at an oblique angle. Although the second magnetic heads 5 and 6 described herein function to read both a digital signal and an FM audio signal, it is also possible to provide a separate head for each of these signals.

A control signal recorded in a linear recording region, which is formed on the magnetic tape 1 parallel to the direction of the tape run, is reproduced by the control head 7 (fixed head) 7 fixed on the path of the magnetic tape 1, and input to the time mode/unrecorded mode determination section 12 and the tape run control section 13 as a reproduction control signal. The time mode/unrecorded mode determination section 12 determines whether a signal is recorded or not recorded ("unrecorded") in a given portion of the magnetic tape 1 based on whether or not a control signal is detected. If a signal is recorded, the time mode/unrecorded mode determination section 12 refers to the cycle of the reproduced control signal to determine a time mode indicating the running speed of the magnetic tape 1 (hereinafter referred to as the "tape run speed") when a signal was recorded thereon. The details of the method of time mode/unrecorded mode determination will be described later.

Based on the time mode information obtained from the time mode/unrecorded mode determination section 12, the tape run control section 13 controls the capstan motor 8 by using an FG (frequency generator) signal from the capstan motor 8 and the reproduced control signal from the control head 7 so as to run the magnetic tape 1 at substantially the same speed and phase as those when a signal was recorded thereon. The phase of the magnetic tape 1 can be adjusted by autotracking or the like.

Thus, the magnetic tape 1 is run with the desired speed and phase by the capstan motor 8 and the pinch roller 9. Moreover, the rotation cylinder 2 rotates at a predetermined rotation speed. As a result, the magnetic heads 3, 4, 5, and 6 helically scan the magnetic tape 1. In the present example, it is assumed that the rotation cylinder 2 has the same rotation rate during digital signal reproduction and analog signal reproduction. However, it will be appreciated that the rotation rate of the rotation cylinder 2 can be different depending on whether a digital signal or an analog signal is being reproduced. In the case where the rotation rate of the rotation cylinder 2 is determined based on the run speed of the magnetic tape 1 in a one-to-one relationship, the rotation rate of the rotation cylinder 2 can be set at the time when the run speed of the magnetic tape 1 is instructed during the time mode/unrecorded mode determination process (described later). In the case where different rotation rates of the rotation cylinder 2 can result from a given run speed of the magnetic tape 1, the rotation rate of the rotation cylinder 2 can be set by a method described in Example 3 of the present invention.

Figure 14A:
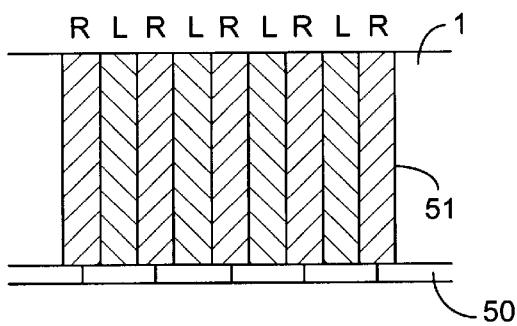
FIG. 14A illustrates a track pattern of an FM audio signal recorded on a magnetic tape according to the present invention.
Figure 14B:
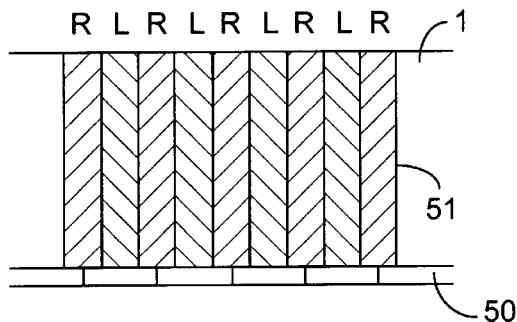
FIG. 14B illustrates a track pattern of a digital signal recorded on the magnetic tape according to Example 1.

FIG. 14A illustrates a track pattern of an FM audio signal recorded on the magnetic tape 1. FIG. 14B illustrates a track pattern of a digital signal recorded on the magnetic tape 1 in accordance with the present example. Although tracks 51 which are subjected to helical scanning are formed obliquely on the magnetic tape 1 in actuality, FIGS. 14A to 14C each illustrate a schematic pattern thereof for conciseness. A control signal is recorded in a linear recording region 50 of the magnetic tape 1. As seen from FIGS. 14A and 14B, the control signal and the tracks 51 (having the R azimuth angle or L azimuth angle) retain the same relationship regardless of whether an FM audio signal or a digital signal is recorded on the magnetic tape 1. Therefore, the second magnetic heads 5 and 6 can accurately trace on the recording tracks 51 to reproduce a recorded signal, without particularly changing the phase of the magnetic tape 1 by using the tape run control section 13 depending on whether an analog signal or a digital signal is reproduced.

Next, the signal process in the case of reproducing analog signals will be described.

An analog video signal recorded on the magnetic tape 1 is reproduced by the first magnetic heads 3 and 4, and then demodulated by the analog video signal process block 15, whereby a reproduced video signal is obtained. The digital/analog detection section 18 detects that the signal is an analog signal (the method of detection will be described later), and switches the first switch 14 so that the outputs of the second magnetic heads 5 and 6 are sent to the FM audio signal process block 16. Thus, the FM audio signal which is multi-layer recorded on the magnetic tape 1 is demodulated by the FM audio signal process block 16, whereby a reproduced audio signal is obtained. The output of the digital/analog detection section 18 switches the second switch 19 and the third switch 20 so that the reproduced video signal and the reproduced audio signal are output to the video signal output terminal 22 and the audio signal output terminal 23, respectively. In the case where there are a plurality of time modes, e.g., an SP (standard play) mode, an LP (long play) mode, and an EP (extended play) mode, dedicated magnetic heads can be used for each time mode, or the same magnetic heads can be used for a number of time modes.

In the case where a digital signal is reproduced, the digital/analog detection section 18 switches the first switch 14 so that the outputs of the second magnetic heads 5 and 6 are sent to the digital signal process block 17 to be demodulated, whereby a reproduced digital signal is obtained. Furthermore, the digital/analog detection section 18 switches the fourth switch 21 so that the reproduced digital signal is output to the digital signal output terminal 24.

Although the first switch 14 is switched so that the outputs of the second magnetic heads 5 and 6 are sent to the FM audio signal process block 16 or the digital signal process block 17 in the present example, it is also possible to configure the reproduction apparatus so that the FM audio signal reproduction and the digital signal reproduction share part of the signal process circuitry (e.g., the preamplifier) and provide a switch at a point before the process branches to different steps so that the signal can be switched to the appropriate step. Furthermore, instead of using the first switch 14, it is also possible to direct the outputs of the second magnetic heads 5 and 6 to both of the FM audio signal process block 16 and the digital signal process block 17, thereby omitting the switching at the digital/analog determination step.

Next, the time mode/unrecorded mode determination process is described with reference to FIG. 2.

Figure 2:
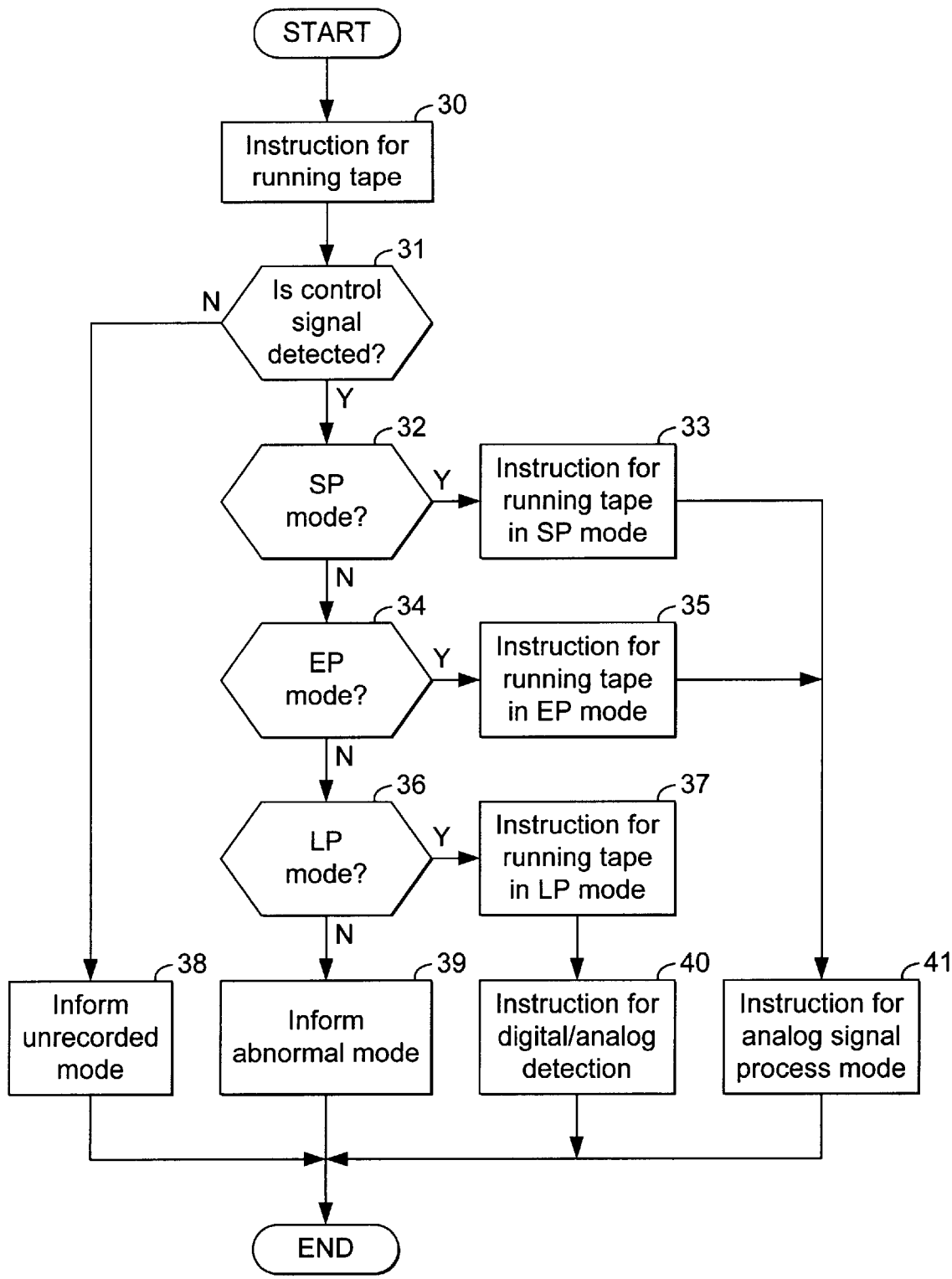
FIG. 2 is a flowchart illustrating an exemplary time mode/unrecorded mode determination process according to Example 1 of the present invention.

FIG. 2 is a flowchart illustrating an exemplary process performed by the time mode/unrecorded mode determination section 12. In the present example, it is assumed that recording/reproduction can be done at three different tape run speeds, resulting in three different time modes, i.e., the SP, EP, and LP modes, and that the SP mode and the EP mode allow only analog signals to be recorded or reproduced whereas the LP mode allows both digital signals and analog signals to be recorded or reproduced.

First, a case is described where a cassette tape is inserted into the VCR of the present invention and then a user instructs playback of the cassette tape. First, the time mode/unrecorded mode determination section 12, receiving an instruction for playback from an overall control section (not shown) of the VCR, issues an instruction for running the magnetic tape 1 in the SP mode, for example, to the tape run control section 13 at step 30, whereby the magnetic tape 1 begins running. When the running of the magnetic tape 1 becomes stable, the time mode/unrecorded mode determination section 12 detects whether or not a control signal is present at step 31. If it is detected that no control signal is recorded on the magnetic tape 1 as opposed to occasional and accidental missing of the control signal, the time mode/unrecorded mode determination section 12 determines that the cassette tape is unrecorded (i.e., unrecorded mode), and informs the unrecorded mode to the tape run control section 13 and the digital/analog detection section 18 at step 38. If it is detected that a control signal is recorded on the magnetic tape 1, the time mode/unrecorded mode determination section 12 determines the time mode by detecting the cycle of the reproduced control signal at steps 32, 34, and 36. If the time mode is neither the SP, EP, nor the LP mode, the time mode/unrecorded mode determination section 12 determines that the cassette tape is in an abnormal mode, and informs the abnormal mode to the tape run control section 13 and the digital/analog detection section 18 at step 39. Herein, the order of determination of the SP, EP, and LP modes can be selected arbitrarily. For example, the determination can be started from the LP mode if a quick reproduction of digital signals is desired. Once the time mode is determined, an instruction for running the magnetic tape 1 in the determined time mode is issued to the tape run control section 13 at steps 33, 38, and 37. Then, in the case where the time mode is a mode which allows both digital signals and analog signals to be recorded or reproduced (i.e., the LP mode in the present example), an instruction for determining whether the reproduced signal is a digital signal or an analog signal is issued to the digital/analog detection section 18 at step 40. Although the present example assumes that the LP mode is the only time mode which allows both digital signals and analog signals to be recorded or reproduced, it is applicable to configure the reproduction apparatus so that more than one time mode allows the recording/reproduction of both digital signals and analog signals. In that case, too, the time mode determination and process are similarly performed.

Since the other time modes (i.e., the SP and EP modes) do not allow the recording/reproduction of digital signals, the time mode/unrecorded mode determination section 12 instructs a reproduction process of the analog signal (analog mode) to the digital/analog detection section 18 at step 41. Although not illustrated in FIG. 2, if the reproduction apparatus has a time mode which only allows the recording/reproduction of digital signals and the current time mode is determined as that time mode, an instruction for a reproduction process of the digital signal (digital mode) can be instructed to the digital/analog detection section 18.

Thus, in the case of time modes which only allow the recording/reproduction of either analog signals or digital signals (i.e., the SP and EP mode in the present example), the digital/analog determination can be quickly made by referring to the control signal to determine whether the signal recorded on the magnetic tape 1 is a digital signal or an analog signal.

Next, the digital/analog detection process is described.

Figure 3:
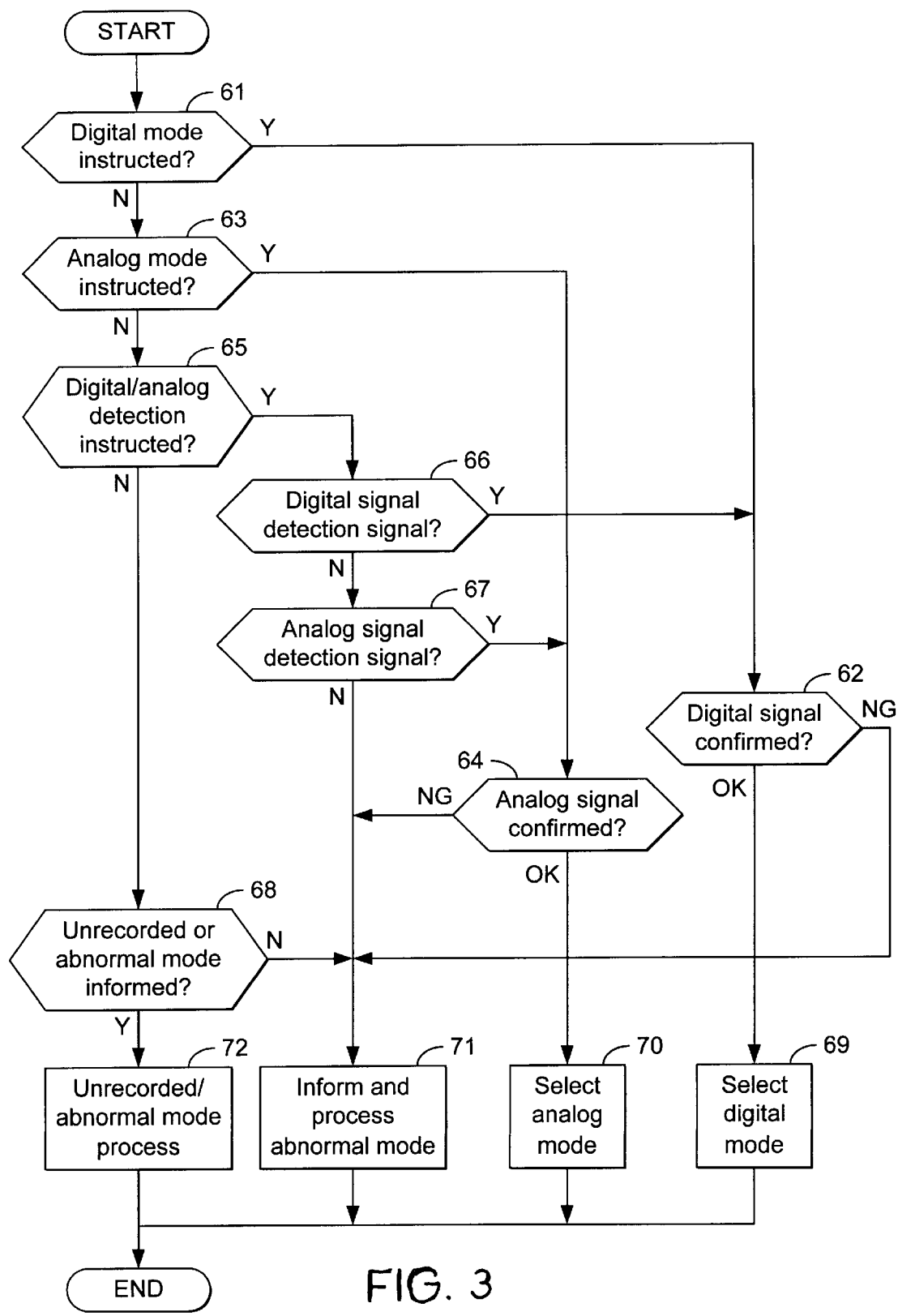
FIG. 3 is a flowchart illustrating an exemplary digital/analog determination process according to Example 1 of the present invention using a digital signal detection signal and an analog signal detection signal.

FIG. 3 is a flowchart illustrating an exemplary process performed by the digital/analog detection section 18. Based on the output of the time mode/unrecorded mode determination section 12, the digital/analog detection section 18 knows whether the magnetic tape 1 is unrecorded, has a digital signal recorded thereon, has an analog signal recorded thereon, has a digital or analog signal recorded thereon, or is in the abnormal mode. Thus, the digital/analog detection section 18 determines the mode at steps 61, 63, 65, and 68 based on the information from the time mode/unrecorded mode determination section 12, as shown in FIG. 3. If the digital mode is instructed (step 61), the digital/analog detection section 18 switches the first switch 14 so that the outputs of the second magnetic heads 5 and 6 are directed to the digital signal process block 17, confirms whether or not a digital signal is properly reproduced based on a digital signal output from the digital signal process block 17 at step 62, and performs a digital mode process at step 69 if a digital signal is properly reproduced. In the digital mode process, the digital/analog detection section 18 switches the fourth switch 21 so that the output of the digital signal process block 17 (i.e., the reproduced digital signal) is output to the digital signal output terminal 24.

If the analog mode is instructed (step 63), the digital/analog detection section 18 switches the first switch 14 so that the outputs of the second magnetic heads 5 and 6 are directed to the FM audio signal process block 16. Then, the digital/analog detection section 18 confirms whether or not an analog signal is properly reproduced based on an analog video signal detection signal or the reproduced video signal output from the analog video signal process block 15 or an analog audio signal detection signal or the reproduced audio signal output from the FM audio signal process block 16 at step 64, and performs an analog mode process at step 70 if an analog signal is properly reproduced. In the analog mode process, the digital/analog detection section 18 switches the second switch 19, the first switch 14, and the third switch 20 so that the reproduced analog video signal and the reproduced analog audio signal are output to the video signal output terminal 22 and the audio signal output terminal 23, respectively.

If it is determined at step 65 that a digital/analog detection is instructed by the time mode/unrecorded mode determination section 12, the digital/analog detection section 18 switches the first switch 14 so that the outputs of the second magnetic heads 5 and 6 are directed to the digital signal process block 17. Then, it is determined at step 66 whether or not a digital signal is recorded on the magnetic tape 1 based on the digital signal detection signal output from the digital signal process block 17. If it is determined that a digital signal is recorded, then it is confirmed at step 62 whether or not the reproduced signal is a digital signal. If it is confirmed that the reproduced signal is a digital signal, the digital mode process is performed at step 69.

If it is determined that a digital signal is not recorded on the magnetic tape 1 at step 66, the digital/analog detection section 18 switches the first switch 14 so that the outputs of the second magnetic heads 5 and 6 are directed to the FM audio signal process block 16. Then, it is determined at step 67 whether or not an analog signal is recorded on the magnetic tape 1 based on the analog signal detection signals (i.e., the analog video signal detection signal from the analog video signal process block 15 and the analog audio signal detection signal from the FM audio signal process block 16). If it is determined that an analog signal is recorded, then it is confirmed at step 64 whether or not the reproduced signal is an analog signal. If it is confirmed that the reproduced signal is an analog signal, the analog mode process is performed at step 70. It is also applicable to perform the determination as to whether the signal is an analog signal before performing the determination as to whether the signal is a digital signal.

The digital/analog detection section 18 informs the abnormal mode to the time mode/unrecorded mode determination section 12 and performs an abnormal mode process at step 71 under any of the following conditions: if no digital signal is reproduced in spite of an instruction for the digital mode; if no analog signal is reproduced in spite of an instruction for the analog mode; if neither digital nor analog signal is reproduced in spite of an instruction for a digital/analog detection; or if no instruction is issued from the time mode/unrecorded mode determination section 12. In the abnormal mode process, the switches 19, 20, and 21 are turned off so that the outputs of the signal process blocks 15, 16, and 17 are not output to the respective output terminals 22, 23, and 24. If the time mode/unrecorded mode determination section 12 informs the unrecorded mode or the abnormal mode (step 68), too, the switches 19, 20, and 21 are turned off at step 72 so that the outputs of the signal process blocks 15, 16, and 17 are not output to the respective output terminals 22, 23, and 24.

If the digital/analog detection section 18 informs the abnormal mode to the time mode/unrecorded mode determination section 12, the time mode/unrecorded mode determination section 12 can repeat the determination of the time mode/unrecorded mode, or alternatively retain the time mode immediately before the detection of the abnormal mode for running the magnetic tape 1.

The confirmation of the digital signal and the confirmation of the analog signal are optional. Therefore, steps 62 and 64 can be omitted.

As described above, the determination as to the digital/analog mode can be made by determining whether or not the signal recorded on the magnetic tape 1 is a digital signal based on the digital signal detection signal and determining whether or not the signal recorded on the magnetic tape 1 is an analog signal based on the analog signal detection signal.

The magnetic tape 1, carrying a digital signal and analog signals recorded thereon, can be reproduced by a simpler configuration by reproducing the FM audio signal and the digital signal using the same magnetic heads, determining the time mode/unrecorded mode based on a control signal and waiting until the tape run becomes stable, and thereafter determining whether the signal recorded on the magnetic tape 1 is a digital signal or an analog signal.

Moreover, it is also applicable to utilize the analog video signal detection signal as the only analog signal detection signal. In this case, the heads for the analog video signal (i.e., the first heads 3 and 4) can be dedicated to the generation of the analog signal detection signal, and the heads for the digital signal/FM audio signal (i.e., the second heads 5 and 6) can be dedicated to the generation of the digital signal detection signal, so that it is unnecessary to operate the FM audio signal process circuitry. As a result, noise becomes less likely to be mixed into the signals, thereby achieving an even more accurate digital/analog determination. It is also unnecessary to switch the first switch 14 during the digital/analog signal detection in this case, so that the digital signal detection and the analog signal detection can be performed substantially simultaneously.

Furthermore, it is also applicable to utilize the analog audio signal detection signal as the only analog signal detection signal. In this case, it is possible to perform a digital/analog determination based on the reproduced FM audio signal and the reproduced digital signal, that is, by only using the heads for the digital signal/FM audio signal (i.e., the second heads 5 and 6). As a result, it is unnecessary to operate the analog video signal process circuitry, so that noise becomes less likely to be mixed into the signals during the determination and the power consumption is reduced.

Instead of using both the analog video signal detection signal and the analog audio signal detection signal as the analog signal detection signals (i.e., signals for detecting the analog mode), it is also possible to use either the analog video signal detection signal or the analog audio signal detection signal. For example, in the case where it is possible that no FM audio signal may be recorded on the magnetic tape 1 or the FM audio signal detection can be inaccurate due to the presence of a digital signal, it is applicable to utilize only the analog video signal detection signal as the analog signal detection signal so as to improve the detection accuracy.

When an instruction for a digital/analog detection is issued in the present example, a digital signal or an analog signal is detected by using the digital signal detection signal or the analog signal detection signal to perform a corresponding mode. However, it is also possible to perform a digital/analog detection by detecting the level of the envelope of the reproduced digital or analog signal and more strictly confirm the reproduced digital or analog signal after the digital/analog determination. Although requiring a confirmation process after the digital/analog determination, such a method can achieve a quick and accurate determination.

Furthermore, it is also possible to perform a tracking adjustment at the time of the analog/digital determination and confirmation of an analog/digital signal. For example, the determination and confirmation can be made after performing a tracking adjustment by autotracking or the like. It is also possible to achieve a quicker digital/analog determination by performing an autotracking at the time of confirmation, instead of at the time of determination, although the confirmation of a digital/analog signal after the determination is required in this case.

In the present example, the reproduced audio signal is a reproduced signal of the FM audio signal. However, if other audio signals such as a linear audio signal recorded in the linear track can be reproduced, it is also applicable to output such an audio signal as the reproduced audio signal. In this case, the level of such an audio signal can be detected to provide an analog signal detection signal for the digital/analog detection.

Moreover, it is also possible to omit the first switch 14 by directing the outputs of the second magnetic heads 5 and 6 to both the FM audio signal process block 16 and the digital signal process block 17, thereby simplifying the configuration of the reproduction apparatus.

Next, an exemplary process of generating the digital signal detection signal is described with reference to FIGS. 4 and 5.

Figure 4:
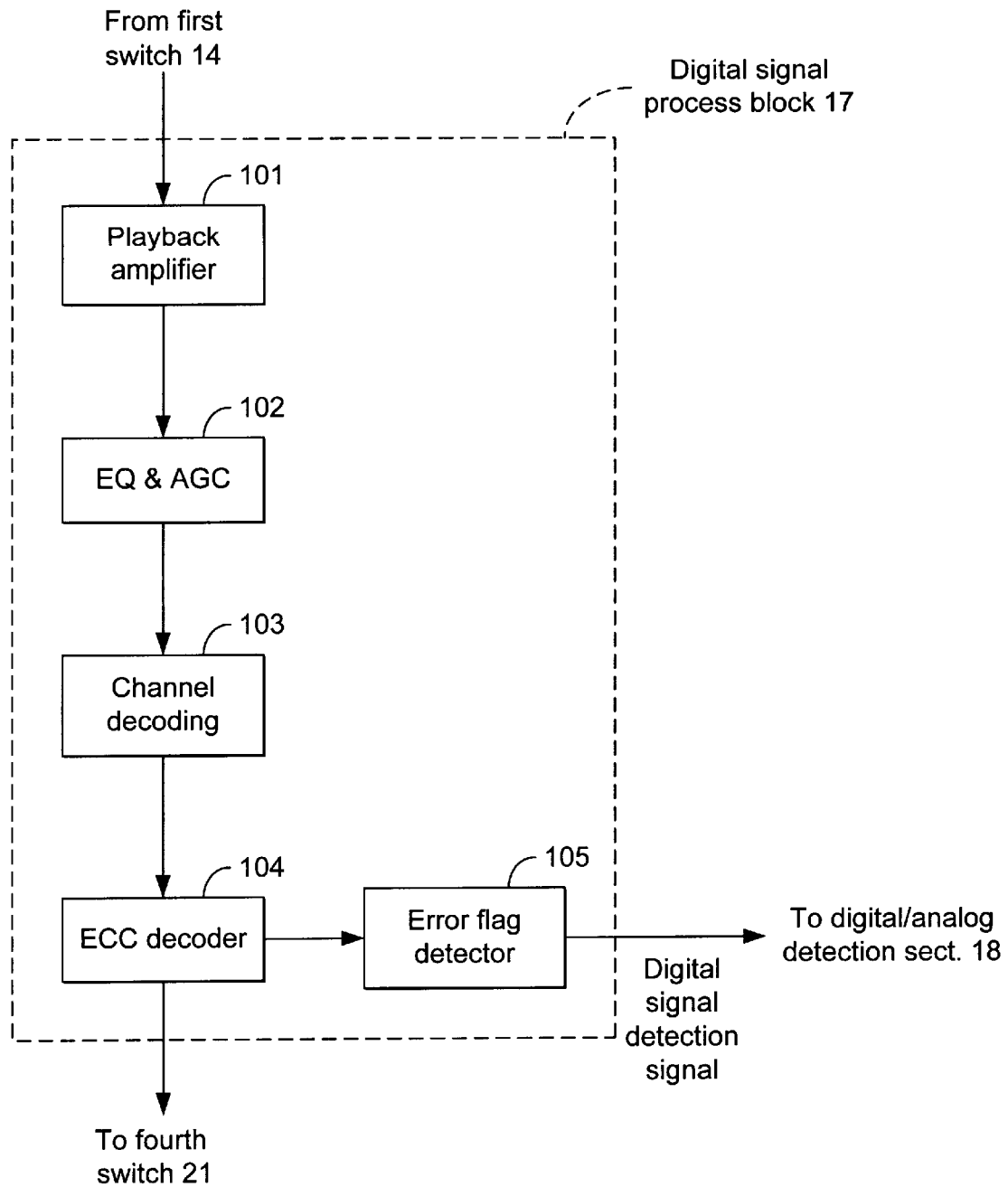
FIG. 4 is a block diagram illustrating an exemplary digital signal process block according to Example 1 of the present invention.

FIG. 4 is a block diagram illustrating an exemplary process performed by the digital signal process block 17. The outputs of the second magnetic heads 5 and 6 are directed to the digital signal process block 17 via the first switch 14, amplified by a playback amplifier 101, and input to a playback equalization/AGC process circuit 102 and a channel decoding circuit 103 so as to be processed thereby. Thereafter, the output of the channel decoding circuit 103 is decoded by an error correction decoder 104 so that the errors in the reproduced signal are corrected. The error correction decoder 104 outputs the decoded digital signal to the fourth switch 21 and outputs error flags (which represent the errors of the reproduced signal) to an error flag detector 105. The error flag detector 105 detects the state of the reproduced signal based on the input error flags (for example, the error flag detector 105 can determine the reproduced signal as proper if the number of error flags per unit time is smaller than a predetermined value). If the digital signal is determined to be properly reproduced, a digital signal detection signal is output to the digital/analog detection section 18. In this exemplary case, the playback amplifier 101, the playback equalization/AGC process circuit 102, the channel decoding circuit 103, the error correction decoder 104, and the error flag detector 105 constitute a digital signal detection signal generation section.

Figure 5:
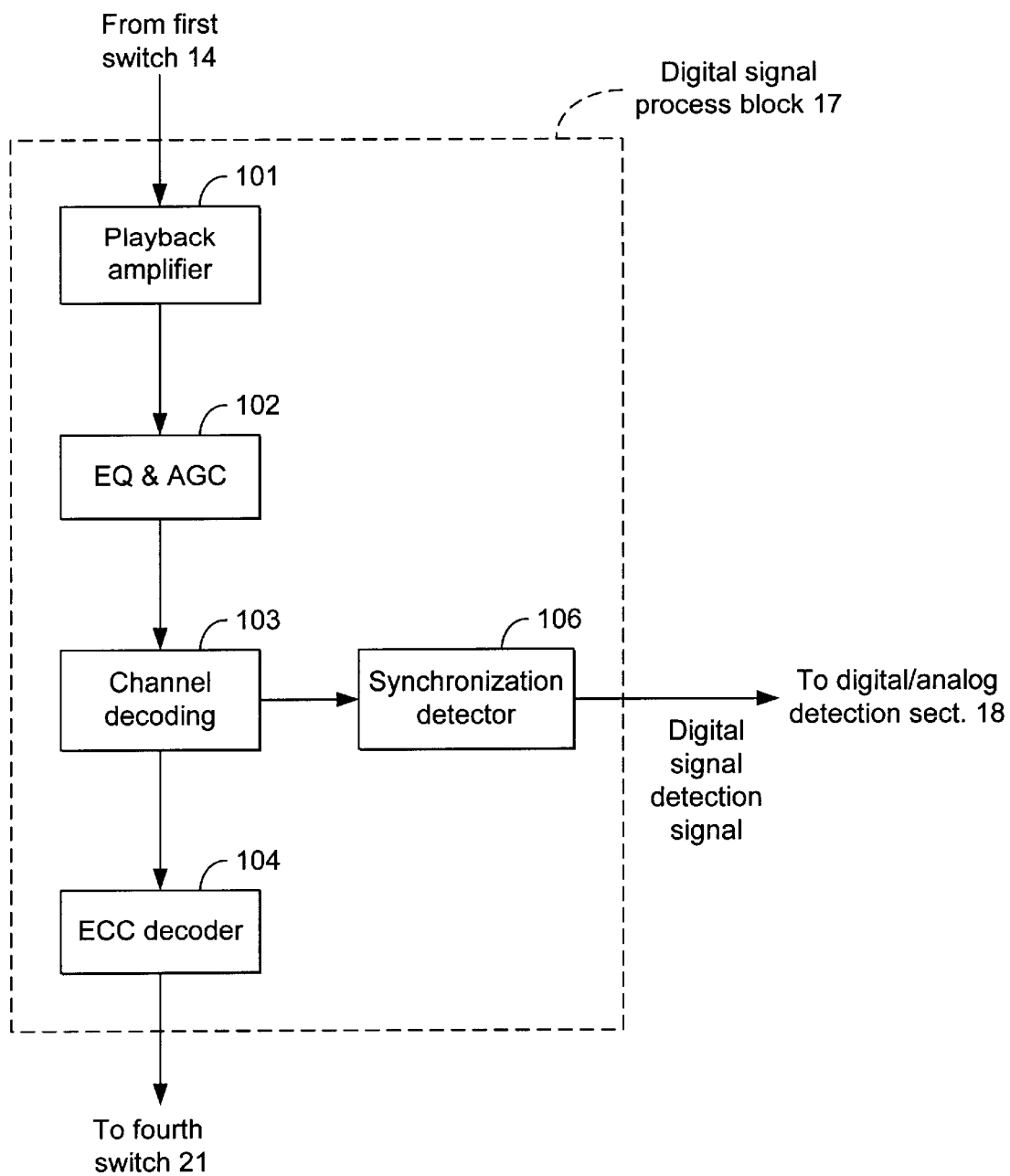
FIG. 5 is a block diagram illustrating another exemplary digital signal process block according to Example 1 of the present invention.

As shown in FIG. 5, it is also possible to derive a signal from the channel decoding circuit 103 and detect a synchronization signal within the digital signal by the synchronization detector 106 so as to check the cycle of the synchronization signal to determine if the synchronization signal is properly reproduced. The result of the determination can be output as the digital signal detection signal. In this exemplary case, the playback amplifier 101, the playback equalization/AGC process circuit 102, the channel decoding circuit 103, and the synchronization detector 106 constitute a digital signal detection signal generation section.

Alternatively, the digital signal detection signal can be generated by detecting the envelope level of the output signal of the playback amplifier 101.

It is also possible to provide a digital signal decoder circuit after the error correction decoder 104 so that the decoded digital signal output from the error correction decoder 104 is converted into an analog video signal and an audio signal before being input to the fourth switch 21.

Next, the analog signal detection signals are described. Either one or both of two analog signal detection signals, i.e., the analog video signal detection signal and the analog audio signal detection signal, can be supplied to the digital/analog detection section 18 for the detection as to whether or not the analog signal recorded on the magnetic tape 1 is properly recorded.

Figure 6:
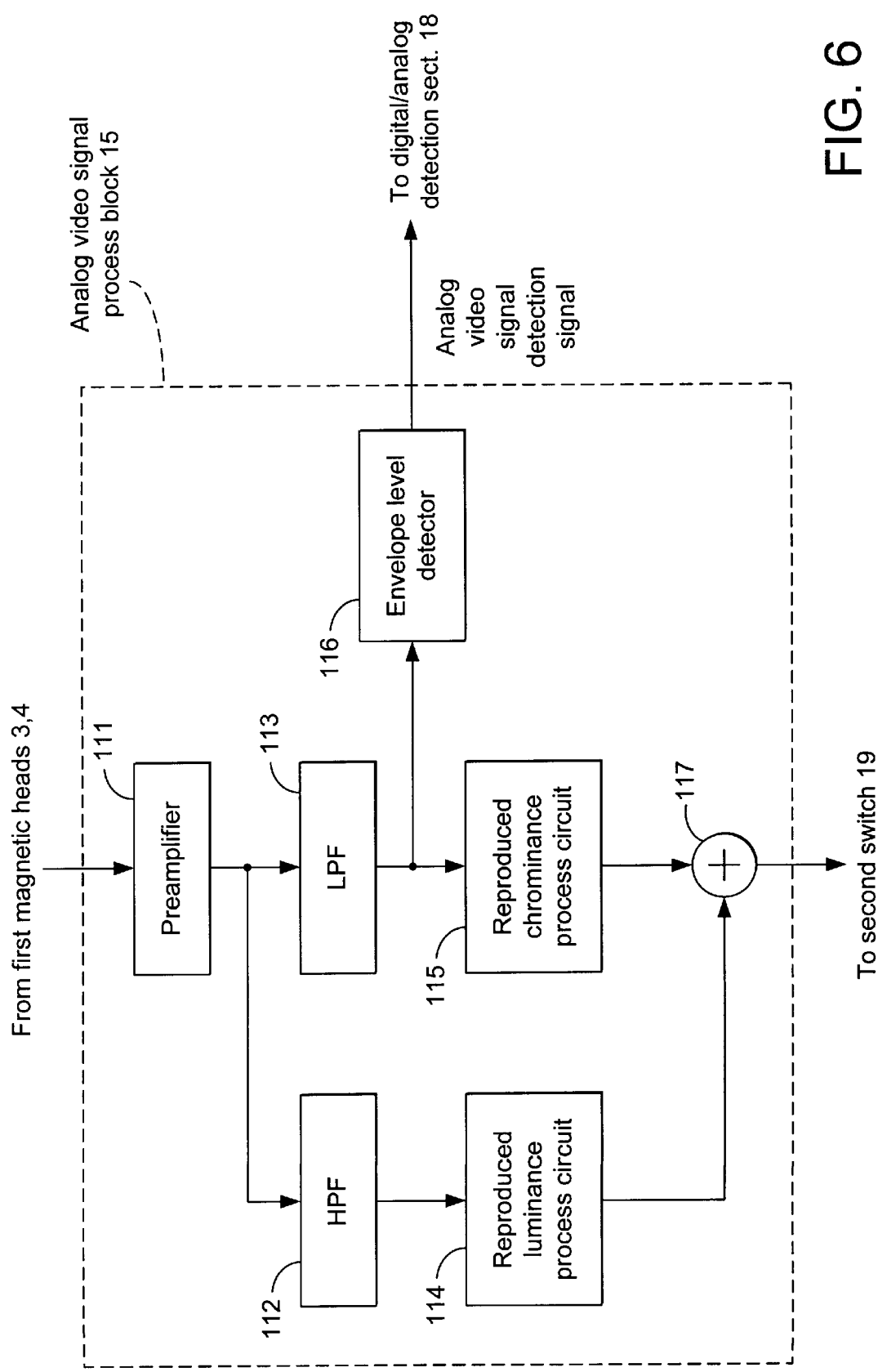
FIG. 6 is a block diagram illustrating an analog video signal process block according to Example 1 of the present invention.

FIG. 6 is a block diagram illustrating an exemplary process of generating the analog video signal detection signal performed by the analog video signal process block 15. The outputs of the first magnetic heads 3 and 4 are amplified by a preamplifier 111 and input to a high pass filter (HPF) 112 and a low pass filter (LPF) 113, whereby a reproduced luminance signal and a reproduced chrominance signal, respectively, are separated. The reproduced luminance signal and the reproduced chrominance signal are demodulated by a reproduced luminance process circuit 114 and a reproduced chrominance process circuit 115, respectively, and are added by an adder 117 so as to be output to the second switch 19. An envelope level detector 116 detects the output envelope level of the LPF 113 so as to output the analog video signal detection signal if the analog video signal is properly reproduced. In this exemplary case, the preamplifier 111, the LPF 113, and the envelope level detector 116 constitute an analog signal detection signal generation section. Instead of detecting the output envelope level of the LPF 113, the envelope of the output of the preamplifier 111 can be detected. It is also possible to detect whether or not a V Sync signal (vertical synchronizing signal) and a H Sync signal (horizontal synchronizing signal) are properly reproduced by using the reproduced luminance process circuit 114 to generate the analog video signal detection signal.

Figure 7:
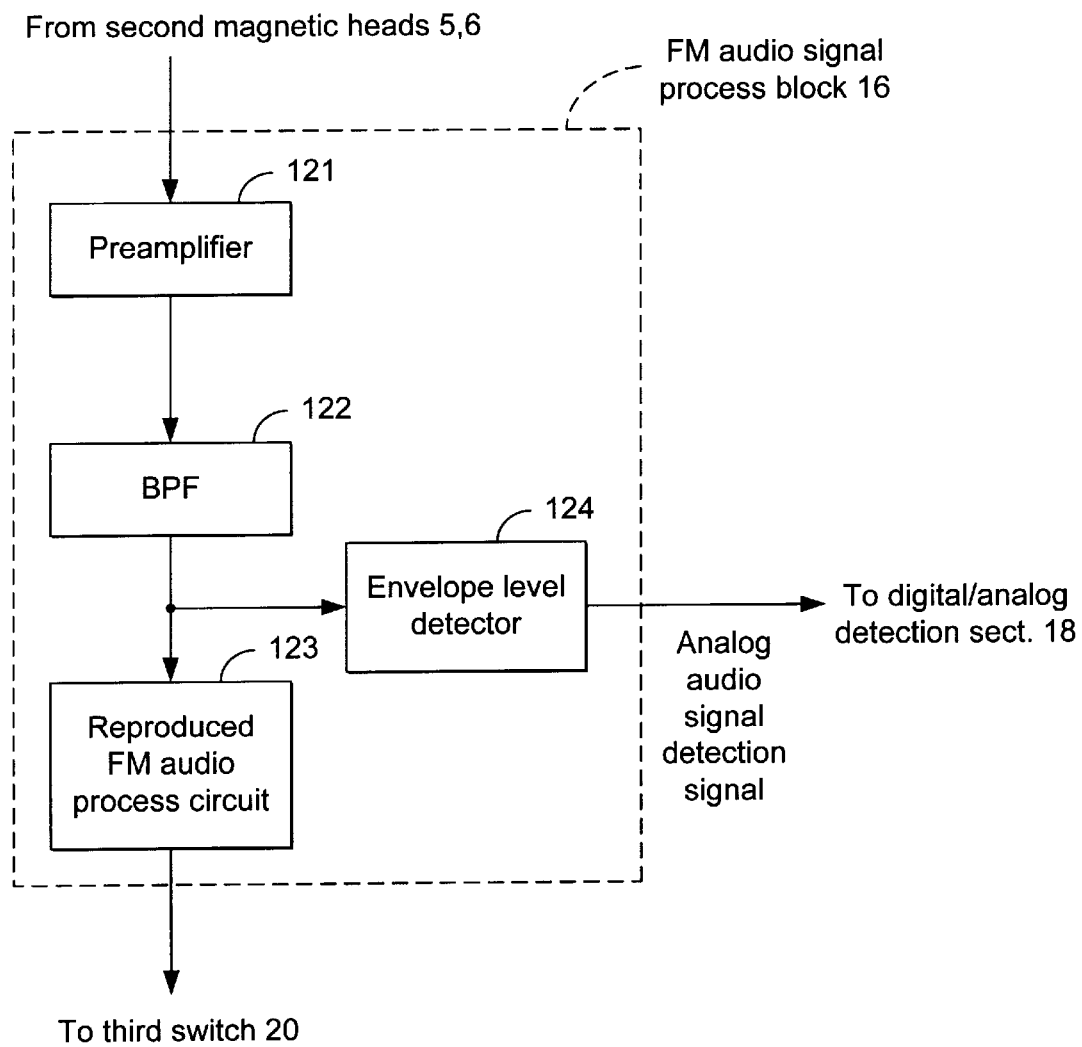
FIG. 7 is a block diagram illustrating an FM audio signal process block according to Example 1 of the present invention.

FIG. 7 is a block diagram illustrating an exemplary process of generating the analog audio signal detection signal performed by the FM audio signal process block 16. The outputs of the second magnetic heads 5 and 6 are amplified by a preamplifier 121 and separated into a right FM audio signal and a left FM audio signal by a band pass filter (BPF) 122. The right FM audio signal and the left FM audio signal are demodulated by a reproduced FM audio process circuit 123 so as to be output to the third switch 20. An envelope level detector 124 detects the output envelope level of the BPF 122 so as to output the analog audio signal detection signal if the analog audio signal is properly reproduced. In this exemplary case, the preamplifier 121, the BPF 122, and the envelope level detector 124 constitute an analog signal detection signal generation section.

The detection of the envelope level can be performed for either one or both of the right FM audio signal and the left FM audio signal. It is also possible to detect the output envelope level of the preamplifier 121 to generate the analog audio signal detection signal. It is also possible to detect whether or not the reproduced audio signal is properly reproduced within the reproduced FM audio process circuit 123 to generate the analog audio signal detection signal.

Next, an exemplary mode detection process in the case where both digital signals and analog signals are recorded in one cassette tape is described.

Figure 8:
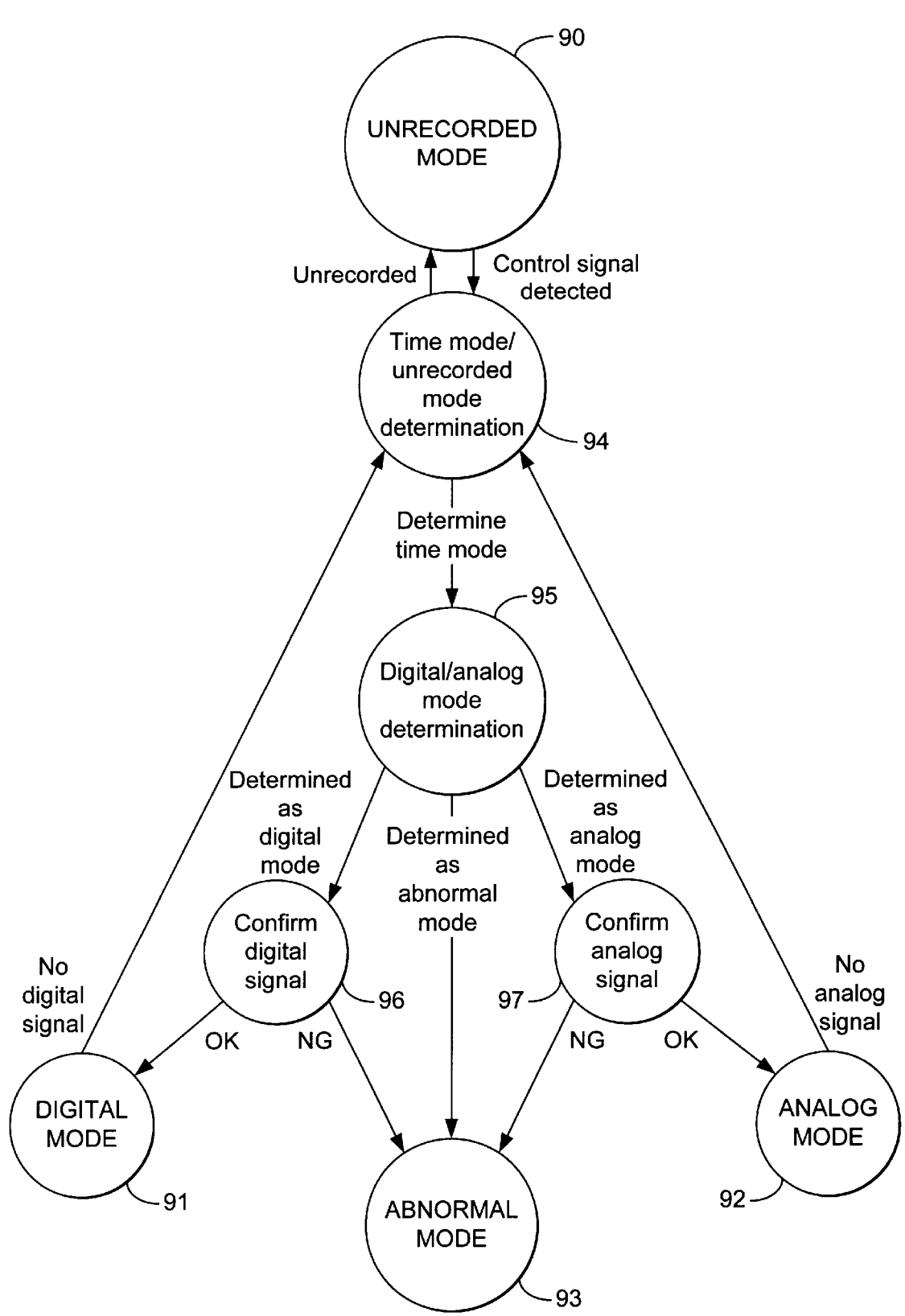
FIG. 8 is a state transition diagram according to Example 1 of the present invention.

FIG. 8 is a state transition diagram illustrating an exemplary mode detection process according to the present example. As described above with reference to FIGS. 2 and 3, the reproduction apparatus of the present example has four modes, i.e., the unrecorded mode 90 (indicating that no signal is recorded on the magnetic tape ), the digital mode 91 (indicating that a digital signal is recorded), the analog mode 92 (indicating that an analog signal is recorded), and the abnormal mode 93 (indicating some abnormality).

First, if a user of the VCR instructs a playback operation while the magnetic heads are scanning an unrecorded region of the magnetic tape 1, the time mode/unrecorded mode determination section 12 determines that the magnetic tape 1 is unrecorded because no control signal is detected. As a result, the tape run control section 13 runs the magnetic tape 1 in the SP mode, for example, and retains the unrecorded mode until a control signal is reproduced. When the end of the unrecorded region of the magnetic tape 1 is reached and a control signal begins to be reproduced, the state shifts to state 94, where the time mode/unrecorded mode determination section 12 determines the time mode and the tape run control section 13 runs the magnetic tape 1 in accordance with the speed and phase of the determined time mode. After the time mode having been thus determined, the digital/analog detection section 18 determines whether a digital signal or an analog signal is recorded on the magnetic tape 1 at state 95. At state 96 or 97, a digital signal or an analog signal is confirmed, and the state shifts to the corresponding mode 91 or 92. The details of the above detection process have been described with reference to FIGS. 2 and 3. States 95, 96, and 97 correspond to the digital/analog detection process described with reference to FIG. 3. Since the presence of the reproduced digital or analog signal is monitored at states 91 and 92, states 96 and 97 can be omitted.

When the state shifts from the digital mode in which the digital signal recorded on the magnetic tape 1 is properly reproduced to another mode so that the digital signal detection signal is no longer detected, the digital/analog detection section 18 recognizes that the end of the region of the magnetic tape 1 in which the digital signal is recorded ("digital signal recorded region") has been reached. Once the end of the digital signal recorded regions is recognized, the state shifts from the digital mode 91 to state 94, where the time mode/unrecorded mode determination section 12 makes a time mode/unrecorded mode determination.

If no control signal is reproduced in a region following the digital signal recorded region, the unrecorded mode is entered. If a time mode is determined in a region following the digital signal recorded region, the state shifts to state 95 for a digital/analog determination. Similarly, the end of an analog signal recorded region can be recognized based on the absence of an analog signal detection signal, so that the state shifts from the analog mode 92 to state 94.

The transition from state 95, 96 or 97 to the abnormal mode 93 occurs under the conditions which were described with reference to FIGS. 2 and 3. Any process can be performed in the abnormal mode 93. For example, the process to be performed in the unrecorded mode can be performed in the abnormal mode 93, and the time mode immediately before the detection of the abnormal mode can be retained for running the magnetic tape 1 (with respect to the tape run speed and phase thereof).

As described above, by first determining the time mode/unrecorded mode based on a control signal and then performing a digital/analog determination based on a reproduced digital or analog signal, the digital/analog mode determination can be made even in the case where both a digital signal and analog signals are recorded on the magnetic tape 1 or where an unrecorded region is included between analog signal recorded regions and/or digital signal recorded regions.

Each digital signal recorded region or each analog signal recorded region can carry a plurality of programs which are continuously recorded or assemble-recorded (i.e., a plurality of programs being recorded at separate times but continuously following each preceding program) as long as a digital or analog signal is recorded in the same time mode. If mistracking occurs due to assemble-recording or the like, the deterioration in the signal level can be detected in the digital or analog mode and the phase of the magnetic tape 1 can be read-justed by autotracking or the like.

In the case where a region following a digital or analog signal recorded region is in the unrecorded mode or a time mode different from the time mode of the immediately preceding region, the end of the digital or analog signal recorded region can be determined based on the control signal. By using the control signal along with the reproduced signals, the reliability of the digital/analog determination can be enhanced.

Figure 9:
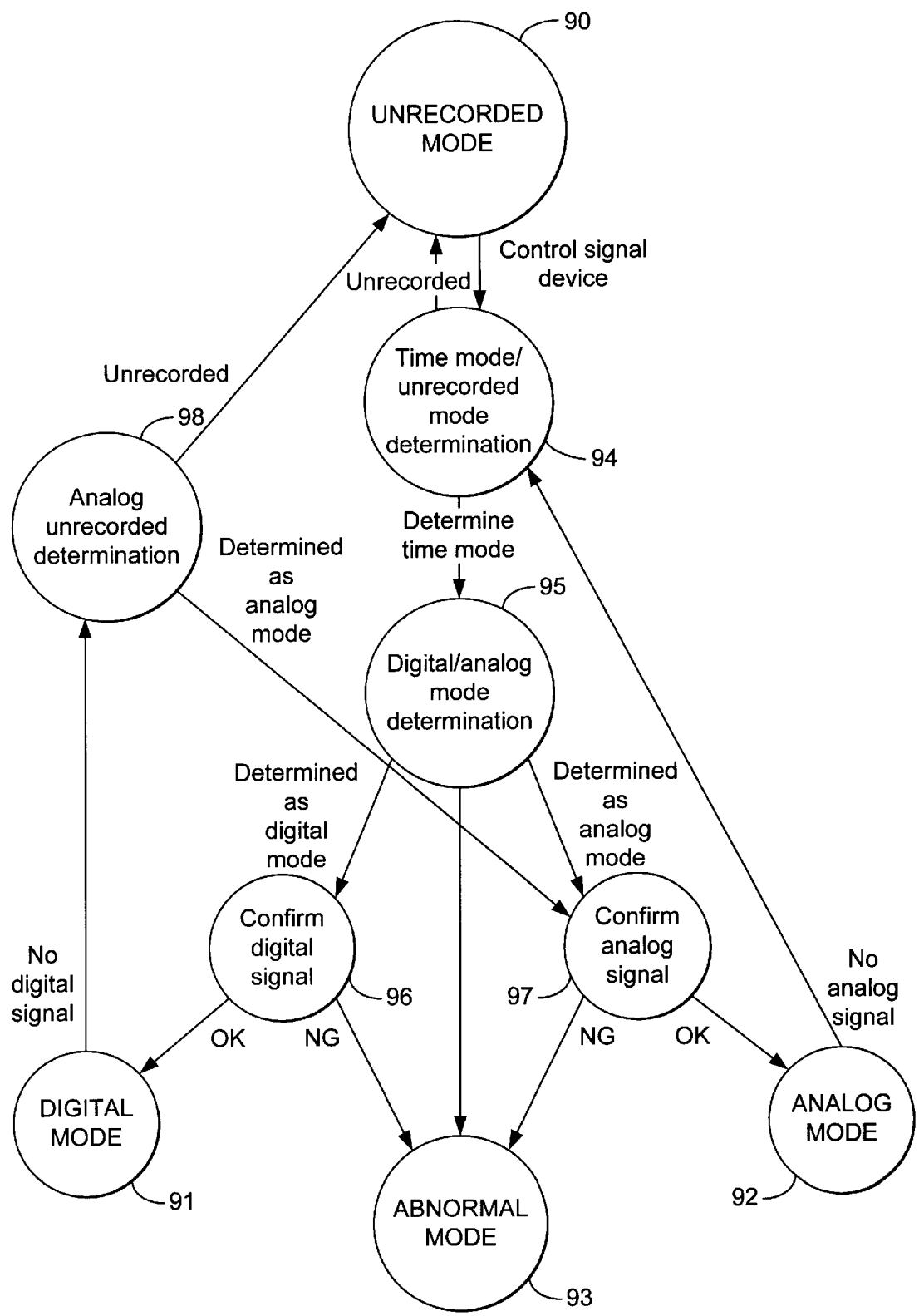
FIG. 9 is a state transition diagram according to example 1 of the present invention, illustrating a case where only one of the time modes allows digital signals to be reproduced.

FIG. 9 is a state transition diagram illustrating a case where only one of the time modes allows digital signals to be reproduced. In this case, the digital/analog detection section 18 determines the end of a digital signal recorded region based on a digital signal detection signal. If a time mode which does not allow the digital mode has been determined based on the control signal at state 98 in a region following the digital signal recorded region, the digital/analog detection section 18 determines that an analog signal is recorded on the magnetic tape 1. Moreover, if the control signal cannot be reproduced at state 98, the digital/analog detection section 18 determines that the magnetic tape 1 is unrecorded in the current region. Thus, the transition from the digital mode 91 to the analog mode 92 can be quickly made by detecting whether or not an analog signal is recorded on the magnetic tape 1 at state 98. The transition from the analog mode 92 to the digital mode 91 in the case where only one of the time modes allows analog signals to be reproduced can be similarly enhanced.

Thus, in the case where only one of the time modes allows digital or analog signals to be reproduced, it can be quickly determined whether an analog or digital signal is recorded in a region following a region in which a digital or analog signal is recorded simply by using the control signal.

As described above, by first determining the time mode/unrecorded mode based on a control signal and then performing a digital/analog determination based on a reproduced digital or analog signal, an accurate digital/analog mode determination can always be achieved.

EXAMPLE 2

Hereinafter, a reproduction apparatus according to Example 2 of the present invention is described with reference to the accompanying figures. Example 2 illustrates a case where the digital/analog detection section 18 performs the digital/analog determination based on only either one of the digital/analog detection signal or the analog signal detection signal.

Figure 10:
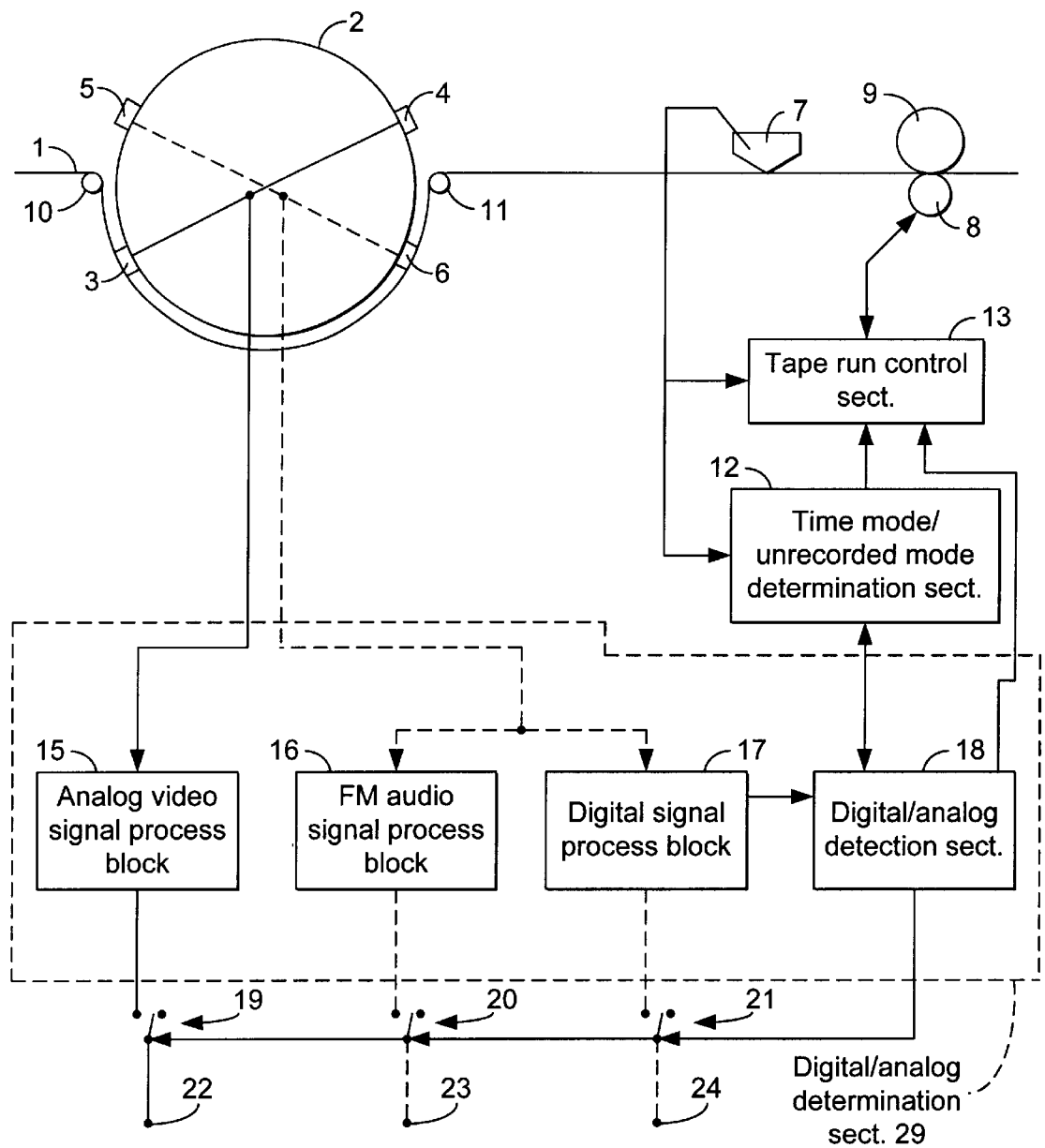
FIG. 10 is a block diagram illustrating a reproduction apparatus according to Example 2 of the present invention.
Figure 11:
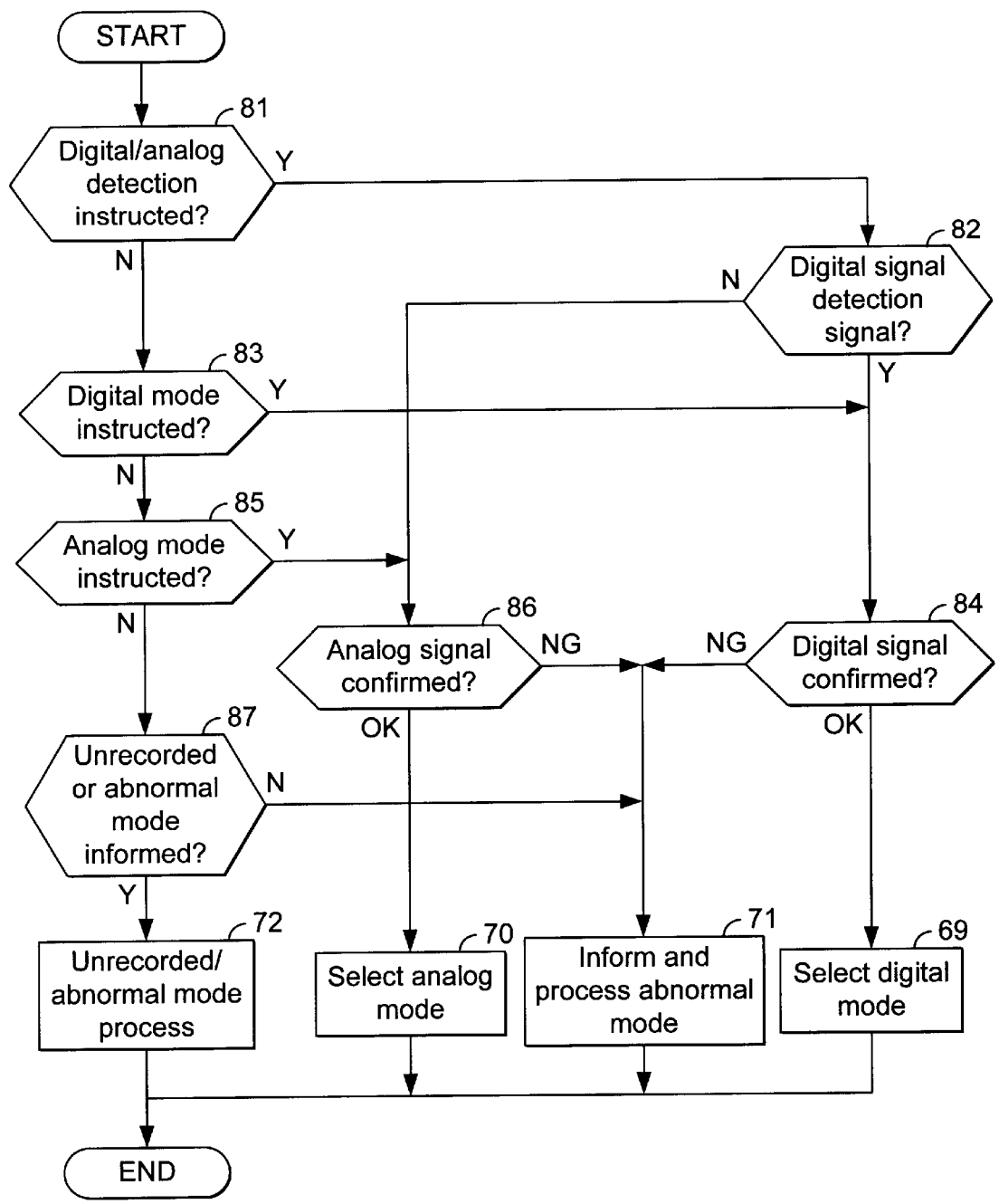
FIG. 11 is a flowchart illustrating an exemplary digital/analog determination process according to Example 2 of the present invention using only a digital signal detection signal.

FIGS. 10 and 11 illustrates a case where the digital/analog determination is made based only on the digital signal detection signal. In FIG. 10, the outputs of second magnetic heads 5 and 6 are sent to an FM audio signal process block 16 and a digital signal process block 17. From these signals, a digital signal detection signal generation section in the digital signal process block 17 generates a digital signal detection signal (by the same generation process as described in Example 1). Based on the generated digital signal detection signal, the digital/analog detection section 18 determines whether the reproduced signal is a digital signal or an analog signal. The digital signal detection signal generation section in the digital signal process block 17 keeps operating even while an analog signal is reproduced, so that the digital/analog determination can be quickly made even when the signal recorded on the magnetic tape 1 changes from an analog signal to a digital signal.

FIG. 11 is a flowchart illustrating an exemplary digital/analog determination process. The time mode/unrecorded mode determination in this exemplary process is identical with that illustrated in FIG. 2. At step 81, it is determined whether or not an instruction for a digital/analog detection is issued. If an instruction for a digital/analog detection has been issued, it is detected at step 82 whether a digital signal or an analog signal is recorded on the magnetic tape 1 by using the digital signal detection signal. If it is detected that a digital signal is recorded based on the digital signal detection signal, a digital mode process (identical with that described in Example 1) is performed at step 69 after confirming whether or not the digital signal is properly reproduced at step 84. If no digital signal detection signal is detected at step 82, the digital/analog detection section 18 determines that an analog signal is recorded and thereafter it is determined whether or not the analog signal is properly reproduced at step 86. If the analog signal is confirmed, an analog mode process (identical with that described in Example 1) is performed at step 70. If the analog or digital signal cannot be confirmed at step 86 or 84, the digital/analog detection section 18 informs the abnormal mode and performs an abnormal mode process (identical with that described in Example 1) at step 71.

If an instruction for the digital or analog mode, the unrecorded mode, or the abnormal mode is received, the corresponding process (identical with that described in FIG. 3) is performed at step 83, 85, or 87, respectively. The method of confirming whether or not a digital or analog signal is properly reproduced at step 84 or 86 can be arbitrarily selected. For example, the confirmation can be made based on the video output signal and/or the audio output signal. Furthermore, the confirmation itself can be omitted.

Figure 12:
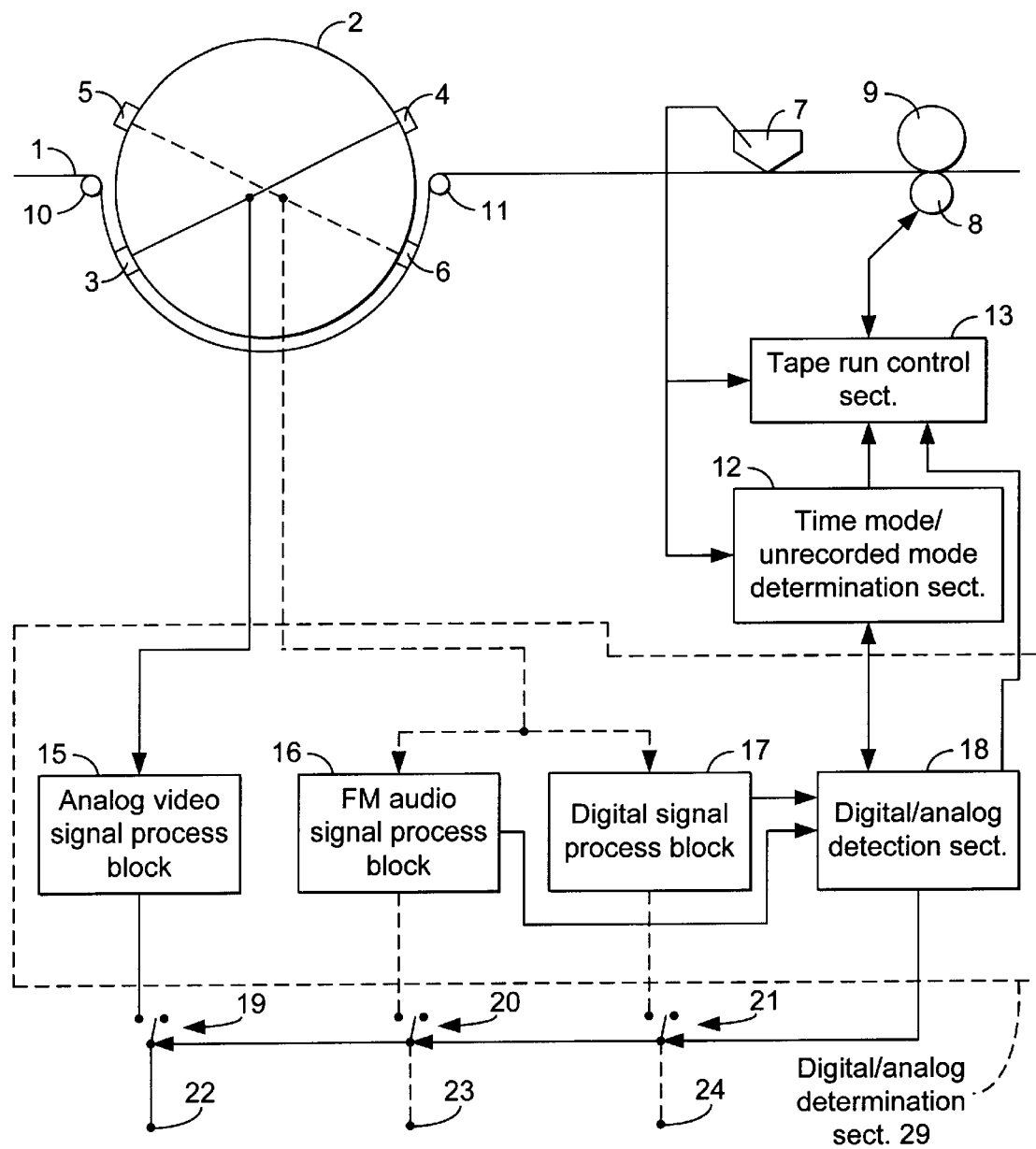
FIG. 12 is a block diagram illustrating a reproduction apparatus according to Example 2 of the present invention using only an analog signal detection signal.

Alternatively, the digital/analog determination can be made based only on the analog signal detection signal(s). FIG. 12 illustrates a case where the reproduction apparatus determines whether a digital signal or an analog signal is recorded on the magnetic tape 1 based only on the analog signal detection signal (e.g., whether or not the FM audio signal is detected).

In FIG. 12, the outputs of second magnetic heads 5 and 6 are sent to an FM audio signal process block 16 and a digital signal process block 17. From these signals, an analog signal detection signal generation section in the FM audio signal process block 16 generates an analog signal detection signal (by the same generation process as described in Example 1). Based on the generated analog signal detection signal, the digital/analog detection section 18 determines whether the reproduced signal is a digital signal or an analog signal. The analog signal detection signal generation section in the FM audio signal process block 16 keeps operating even while a digital signal is reproduced, so that the digital/analog determination can be quickly made even when the signal recorded on the magnetic tape 1 changes from a digital signal to an analog signal. The digital/analog detection process is similar to the process described in FIG. 11, and the description thereof is omitted. It will be appreciated that the analog signal detection signal generation section in the analog video signal process block 15 can be used instead of the analog signal detection signal generation section in the FM audio signal process block 16.

Figure 13:
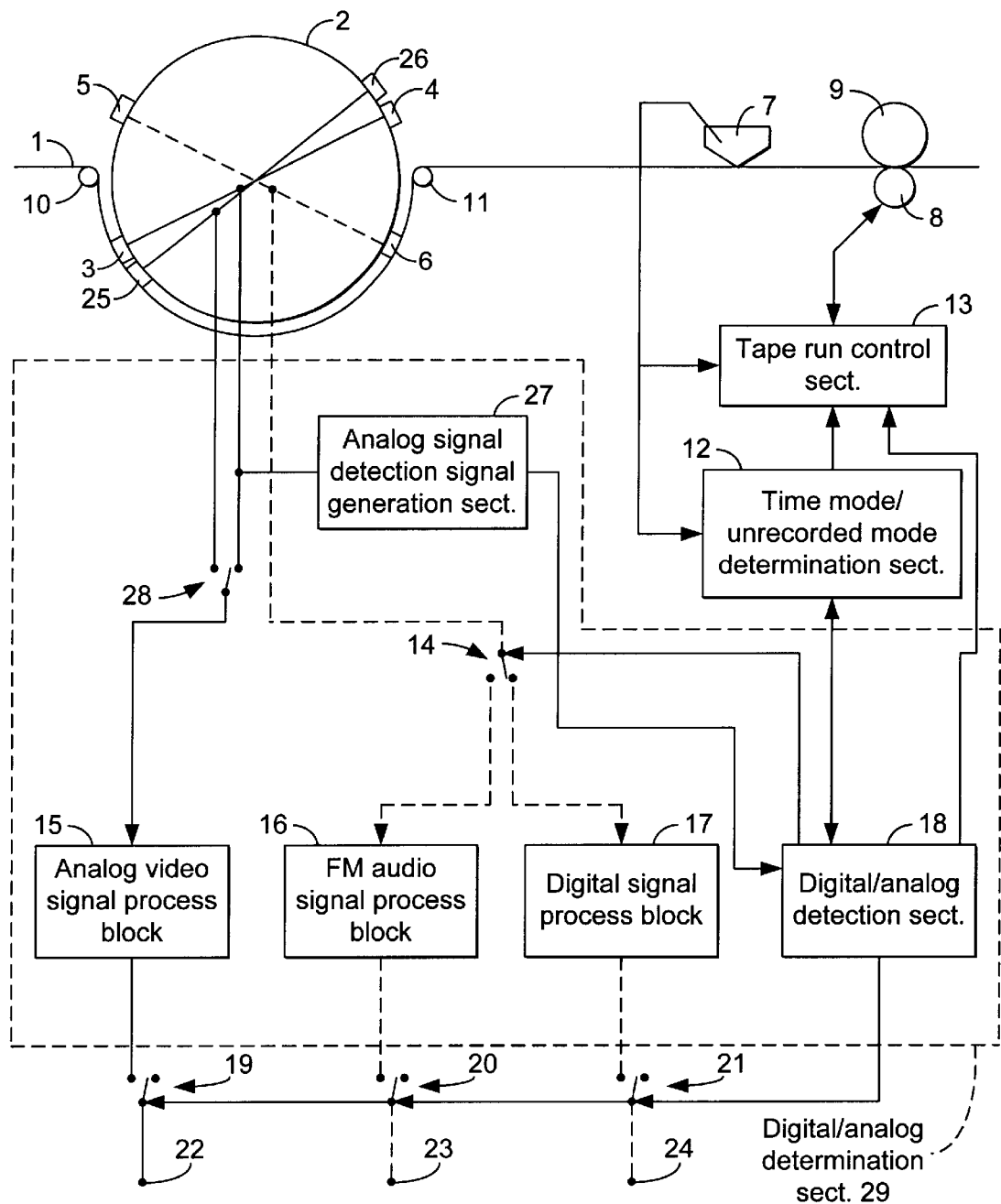
FIG. 13 is a block diagram illustrating a reproduction apparatus according to Example 2 of the present invention using a plurality of magnetic heads for analog signals.

FIG. 13 illustrates an exemplary case where a plurality of magnetic heads are provided for the reproduction of the analog video signal. In FIG. 13, magnetic heads 25 and 26 are provided as long-time mode heads. The long-time mode magnetic heads 25 and 26 have a gap width smaller than that of the first magnetic heads 3 and 4 so that reproduction with less crosstalk from adjacent tracks is possible even in the case where the tracks are narrow (e.g., in the LP and EP modes). A fifth switch 28 switches between the outputs of the long-time mode magnetic heads (25 and 26) and first magnetic heads (3 and 4). Thus, either the outputs of the long-time mode magnetic heads 25 and 26 or the outputs of the first magnetic heads 3 and 4 are sent to an analog video signal process block 15. The outputs of the first magnetic heads 3 and 4 are also sent to an analog signal detection signal generation section 27. Using an analog signal detection signal generated by the analog signal detection signal generation section 27, the digital/analog detection section 18 determines whether a digital signal or an analog signal is recorded on the magnetic tape 1. The analog signal detection signal generation section 27 is similar to the analog signal detection signal generation section described with reference to FIG. 6 (for example, it detects the H Sync signal in the reproduced analog signal). The analog signal detection signal generation section 27 keeps operating during the digital mode and the narrow-track time modes (e.g., the LP and EP modes) for reproducing analog signals so as to constantly monitor whether the signal recorded on the magnetic tape 1 is a digital signal or an analog signal. By thus using the first magnetic heads 3 and 4 having a relatively large gap width for deriving a signal for generating the analog signal detection signal, the tracks of the magnetic tape 1 can be sufficiently scanned, even during the narrow-track time modes, to enable the detection as to whether or not an analog signal is recorded, without requiring unduly increased tracking accuracy.

As described above, according to the present example, it is possible to determine whether a digital signal or an analog signal is recorded on the magnetic tape 1 based only on either the reproduced digital signal or the reproduced analog signal. Thus, the digital/analog determination can be made through only one detection, thereby facilitating the detection process and simplifying the configuration of the apparatus. The probability of the inclusion of noise can be reduced by suspending the signal process circuitry that is not used for the detection while performing the detection, whereby the accuracy of the digital/analog determination can be increased.

EXAMPLE 3

Figure 14C:
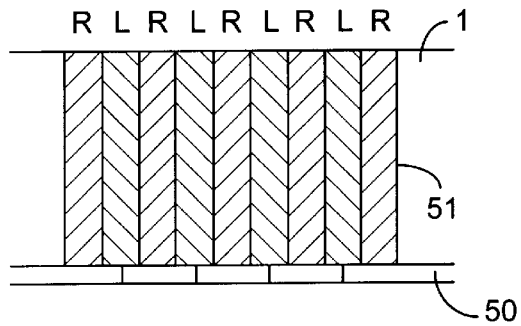
FIG. 14C illustrates a track pattern of a digital signal recorded on the magnetic tape according to Example 3.
Figure 14D:
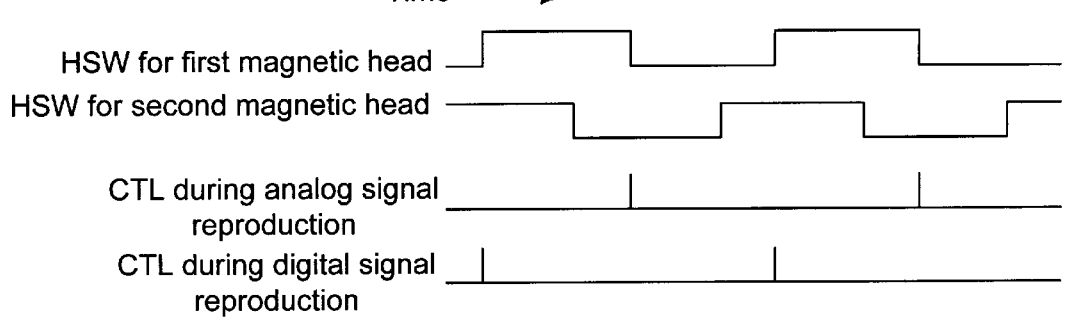
FIG. 14D is a timing diagram illustrating head switch signals and reproduced control signals according to Example 3.

Hereinafter, a reproduction apparatus according to Example 3 of the present invention is described with reference to the accompanying figures. The block diagram of the reproduction apparatus of the present example, the time mode/unrecorded mode determination, and the state transition are similar to those described in Example 1, and the description thereof is omitted. FIG. 14C shows the track pattern of a digital signal (recorded on a magnetic tape 1) in accordance with the present example. The phase of the control signal recorded in a linear region 50 is shifted by 180° from the phase of the control signal of the track pattern in the case where the FM audio signal is recorded as shown in FIG. 14A. FIG. 14D shows head switch (HSW) signals and reproduced control signals (CTL) in the present example. The signal HSW for the first magnetic heads 3 and 4, the signal HSW for the second magnetic heads 5 and 6, and the signal CTL during analog signal reproduction retain the phase relationship illustrated in FIG. 14D also in Example 1. However, the phase of the signal CTL during analog signal reproduction and the phase of the signal CTL during digital signal reproduction are identical in Example 1, unlike in the case of the present example shown in FIG. 14D. The signals HSW are in synchronization with the rotation of the rotation cylinder 2, so that the frequency of the signals HSW is equal to the rotation rate of the rotation cylinder 2. However, the phase of the signal HSW for the first magnetic heads 3 and 4 and the phase of the signal HSW for the second magnetic heads 5 and 6 are shifted with respect to each other corresponding to an angle between the positions of the first magnetic heads 3 and 4 and the positions of the second magnetic heads 5 and 6 on the rotation cylinder 2. Each signal CTL is the wave form of the control signal recorded in the linear recording region 50 as reproduced by the control head (fixed head) 7. It is assumed that the run speed of the magnetic tape 1 during digital signal reproduction and the run speed of the magnetic tape 1 during analog signal reproduction are equal.

First, the magnetic tape 1 having a track pattern shown in FIG. 14A (carrying an analog signal recorded thereon) is run in accordance with the phase of the signal CTL during analog signal reproduction (shown in FIG. 14D). As a result, the second magnetic head 5 having the R azimuth angle scans on the tracks of the magnetic tape 1 having the R azimuth angle, and the second magnetic head 6 having the L azimuth angle scans on the tracks of the magnetic tape 1 having the L azimuth angle, whereby the FM audio signal recorded in these tracks is reproduced. Similarly, the first magnetic heads 3 and 4 scan on the tracks having corresponding azimuth angles so as to reproduce an analog video signal. This principle also applies to Example 1.

Next, if the magnetic tape 1 having a track pattern shown in FIG. 14C (carrying a digital signal recorded thereon) is run in accordance with the phase relationship between the signals HSW for the second magnetic heads 5 and 6 and the signal CTL during analog signal reproduction (shown in FIG. 14D) in the same manner described in Example 1, the second magnetic head 5 having the R azimuth angle scans on the tracks of the magnetic tape 1 having the L azimuth angle, and the second magnetic head 6 having the L azimuth angle scans on the tracks of the magnetic tape 1 having the R azimuth angle, according to the present example. As a result, the signal recorded in these tracks cannot be reproduced owing to azimuth loss according to the present example. (In Example 1, on the other hand, the signal would be improperly reproduced since the phase of the signal CTL during digital signal reproduction is the same as the phase of the signal CTL during analog signal reproduction).

By thus shifting the phase of the control signal in the linear region 50 depending on whether an FM audio signal is recorded or a digital signal is recorded, it becomes possible to prevent unpleasant noise (beat noise, etc.) from occurring when a magnetic tape carrying digital signals recorded thereon is played by a reproduction apparatus which is incapable of reproducing digital signals.

Accordingly, when reproducing a digital signal recorded on the magnetic tape 1 having the track pattern shown in FIG. 14C, the overall control section of the VCR sends an instruction to the tape run control section 13 for running the magnetic tape 1 in the digital mode. As a result, the tape run control section 13 sets the phase of the running magnetic tape 1 at a phase identical with the phase of the signal CTL during digital signal reproduction (shown in FIG. 14D), thereby setting the "phase reference". Thus, the magnetic tape 1 is run in accordance with the desired phase and speed. Consequently, the second magnetic heads 5 and 6 scan on the tracks having the respective corresponding azimuth angles, thereby successfully reproducing the digital signal recorded on the magnetic tape 1.

Figure 15:
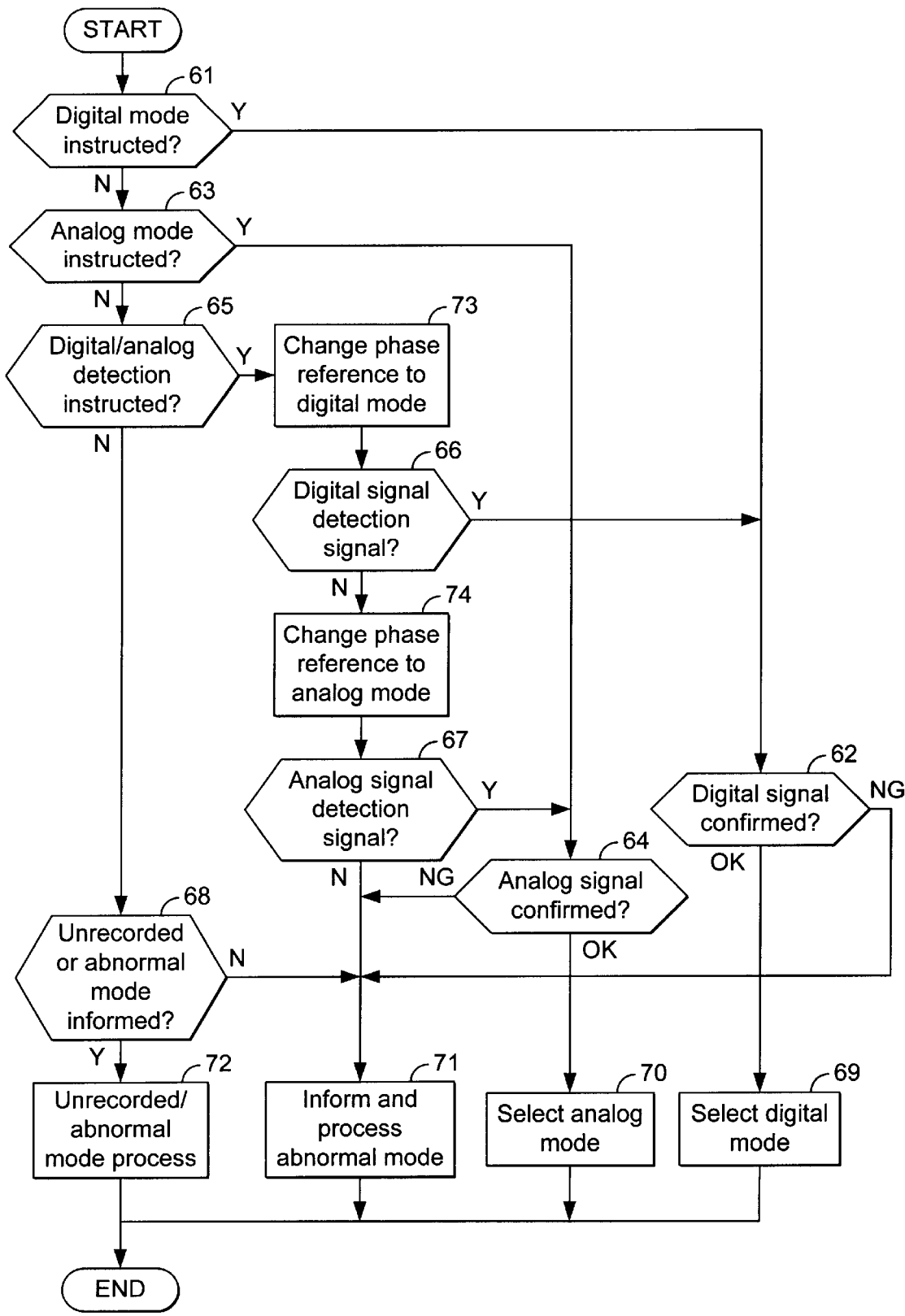
FIG. 15 is a flowchart illustrating an exemplary digital/analog determination process according to Example 3 of the present invention.

FIG. 15 is a flowchart illustrating an exemplary process of the digital/analog determination in Example 3. The steps which are identical with the steps in FIG. 3 are indicated by the same reference numerals as used therein, and the descriptions thereof are omitted. If it is recognized at step 65 that an instruction for a digital/analog detection is issued from the time mode/unrecorded mode determination section 12, the digital/analog detection section 18 issues an instruction at step 73 to the tape run control section 13 for changing the phase of the magnetic tape 1 to the phase appropriate for the digital mode. In response to this instruction, the tape run control section 13 changes the phase reference of the magnetic tape 1 so that the second magnetic head 5 (having the R azimuth angle) scans on the tracks having the R azimuth angle and that the second magnetic head 6 (having the L azimuth angle) scans on the tracks having the L azimuth angle shown in FIG. 14C.

Step 73 can be omitted by configuring the reproduction apparatus so that, after determining a time mode, the time mode/unrecorded mode determination section 12 issues an instruction for running the magnetic tape 1 in accordance with the speed and phase appropriate for the digital mode concurrently with an instruction for a digital/analog detection.

Next, the presence/absence of the digital signal detection signal is detected at step 66. If a digital signal detection signal is detected, the digital signal is confirmed at step 62. If the digital signal is properly reproduced, a digital mode process (identical with that described in Example 1) is performed at step 69. If no digital signal detection signal is detected at step 66, an instruction is issued at step 74 to the tape run control section 13 for changing the phase reference of the magnetic tape 1 to the phase appropriate for the analog mode. It is detected at step 67 whether or not an analog signal is recorded based on the presence/absence of the analog signal detection signal. If the analog signal detection signal is detected, the analog signal is confirmed at step 64. If the analog signal is properly reproduced, an analog mode process (identical with that described in Example 1) is performed at step 70. The abnormal mode is informed and an abnormal mode process (identical with that described in Example 1) is performed at step 71 under any of the following conditions: if the digital signal cannot be confirmed at step 62 if the analog signal detection signal is not detected at step 67; or if the analog signal cannot be confirmed at step 64.

The confirmation of the digital signal and the analog signal is not essential, and steps 62 and 64 can be omitted.

As described above, by first determining the time mode/unrecorded mode based on a control signal and then adjusting the phase of the magnetic tape 1 and performing a digital/analog determination based on a reproduced digital or analog signal by the digital/analog detection section 18, an accurate digital/analog mode determination can be achieved even in the case where the control signal has a different phase depending on whether a digital signal or an analog signal is recorded.

When changing the phase reference before detecting the digital or analog signal detection signal, it is possible to perform autotracking to fix the phase of the magnetic tape 1 at the optimum tracking position before the detection of a digital or analog signal. Alternatively, it is possible to perform autotracking without changing the phase reference and detect the optimum tracking point to determine the phase of the magnetic tape 1 before the detection of a digital or analog signal.

Although both a digital signal detection signal and an analog signal detection signal are used in the present example, the digital/analog determination is also possible by using only either one of the detection signals as described in Example 2.

By using a magnetic head having a gap width larger than the track pitch (e.g., a magnetic head with a gap width equal to or larger than twice the track pitch) as described with reference to FIG. 13, it is possible to generate the analog signal detection signal without changing the phase reference as described in the present example. By thus omitting the step of changing the phase reference, the digital/analog determination can be quickly achieved.

The present example illustrated a case where the control signal has a different phase depending on whether a digital signal or an analog signal is recorded on the magnetic tape 1. Moreover, the principle of the present example can be applied to the case where the rotation cylinder 2 has a different rotation rate depending on whether a digital signal or an analog signal is recorded on the magnetic tape 1 by changing the rotation rate of the rotation cylinder 2 at steps 73 and 74, whereby an accurate digital/analog determination is achieved.

EXAMPLE 4

Hereinafter, a reproduction apparatus according to Example 4 of the present invention is described with reference to the accompanying figures.

If the control signal has a different phase depending on whether a digital signal or an FM audio signal is recorded as in Example 3, the digital/analog signal detection may take some time because of changing the phase reference of the magnetic tape 1. When treating cassette tapes, it is rare to include both the digital signal and the analog signal in the same cassette tape. Therefore, when an unrecorded region is included between analog signal recorded regions and/or digital signal recorded regions in the magnetic tape 1, it is possible to perform a digital/analog detection with respect to a reproduction mode which was being taken in a region immediately preceding the unrecorded region before performing a digital/analog detection with respect to any other reproduction mode. As a result, the determination can be achieved in a shorter time. (As used herein, a "reproduction mode", which indicates whether a signal recorded on the magnetic tape 1 is a digital signal or an analog signal, includes a digital mode and an analog mode).

Since it is also rare that recording is made in more than one time mode in the same cassette tape, it is alternatively possible to perform a time mode detection with respect to a time mode which was being taken in a region immediately preceding the unrecorded region, before performing a time mode detection with respect to any other time mode, thereby similarly reducing the determination time.

Figure 16:
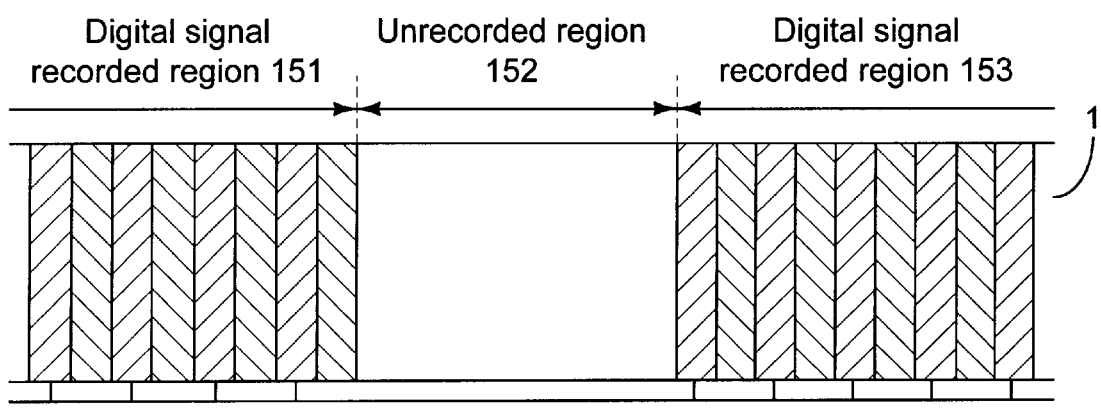
FIG. 16 illustrates an exemplary magnetic tape including both a signal recorded region and an unrecorded region according to Example 4 of the present invention.
Figure 17:
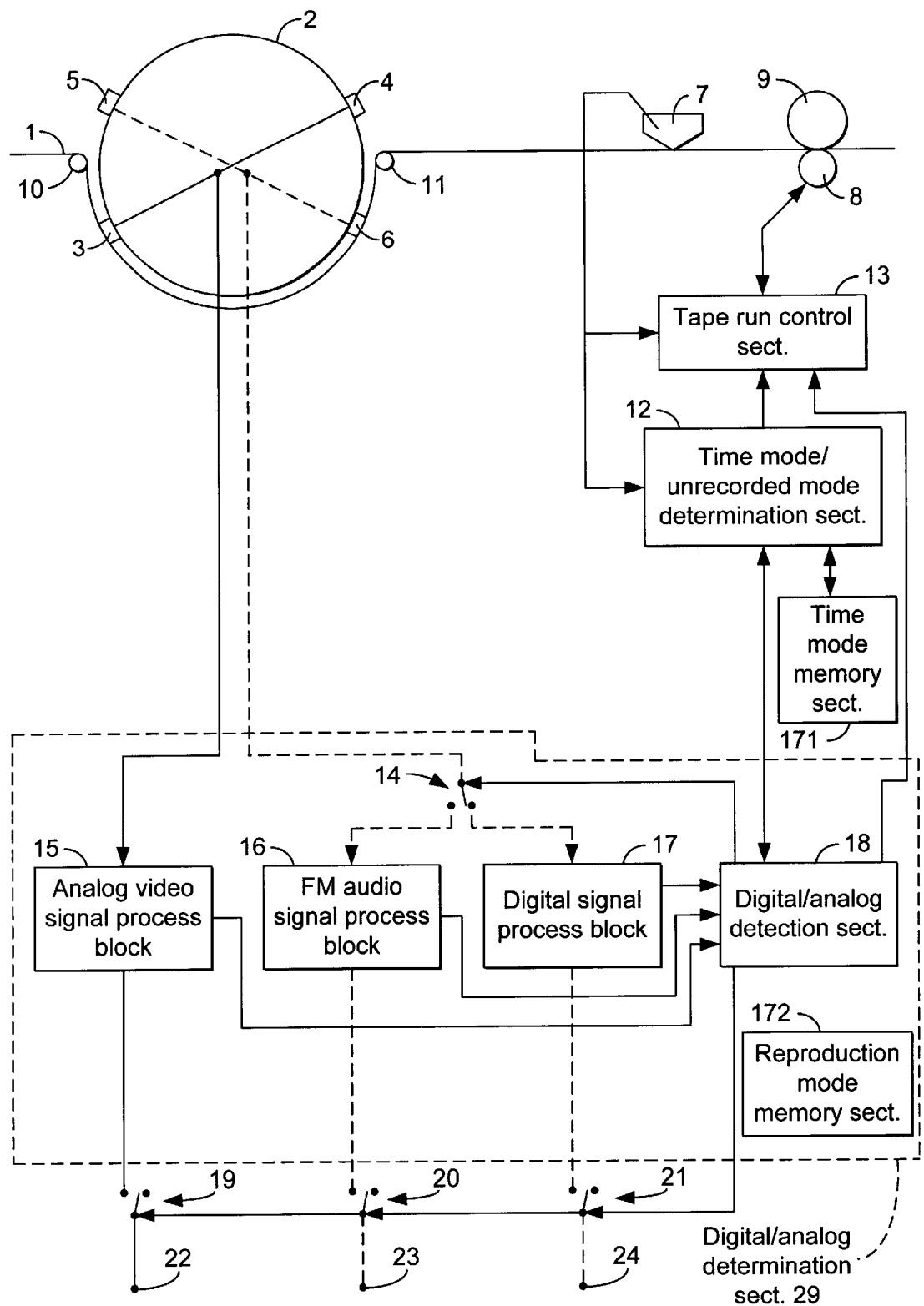
FIG. 17 is a block diagram illustrating a reproduction apparatus according to Example 4 of the present invention.

FIG. 16 illustrates an exemplary magnetic tape 1 including both a signal recorded region and an unrecorded region. On the magnetic tape 1, a digital signal recorded region 151 (where a digital signal is recorded) is followed by an unrecorded region 152, which in turn is followed by another digital signal recorded region 153. FIG. 17 is a block diagram illustrating the reproduction apparatus according to the present example. The blocks which are identical to the blocks in FIG. 1 are indicated by the same reference numerals as used therein, and the description thereof are omitted. A time mode memory section 171 stores results of determination by a time mode/unrecorded mode determination section 12. A reproduction mode memory section 172 stores results of determination by a digital/analog detection section 18.

Figure 18:
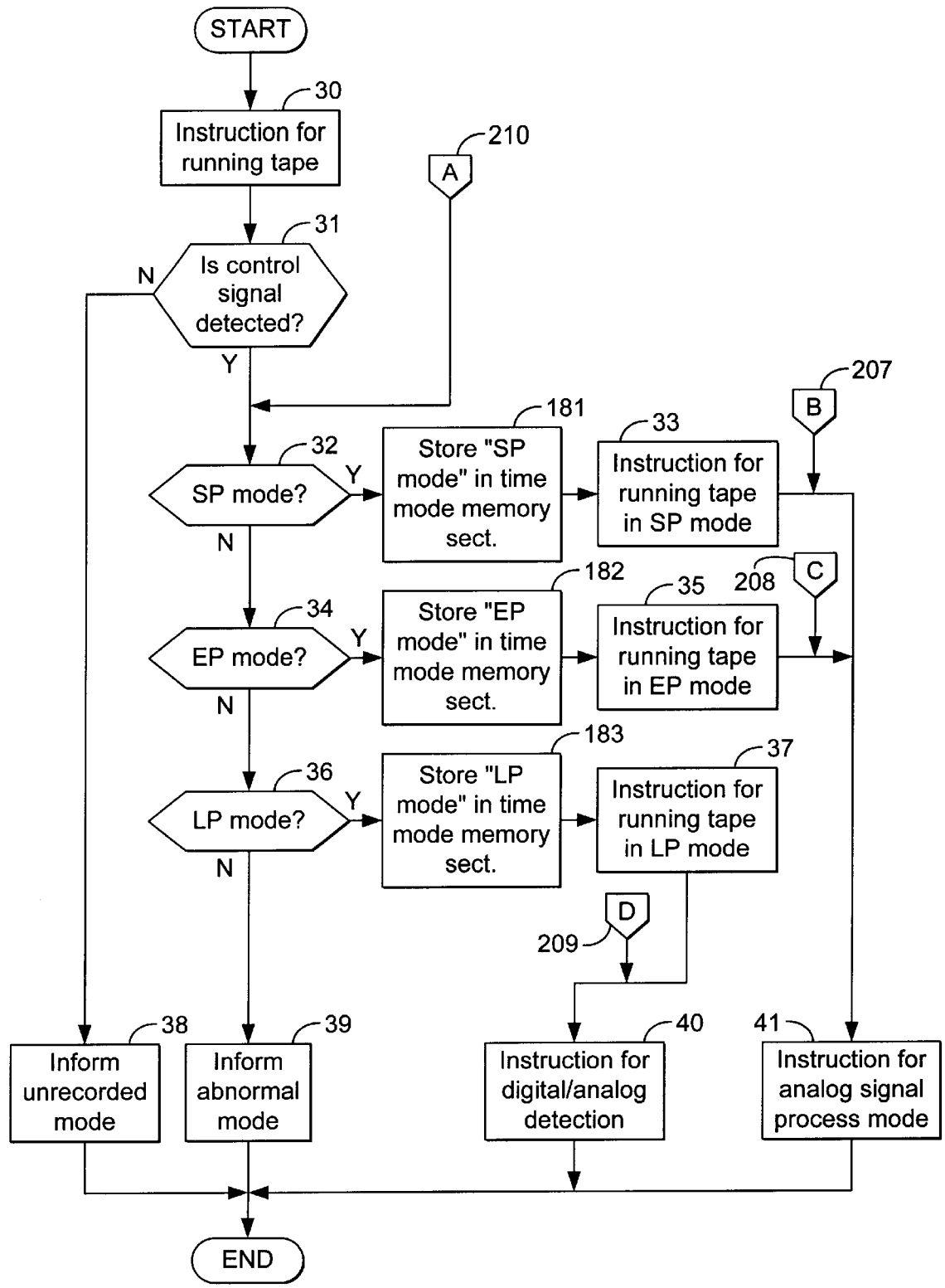
FIG. 18 is a flowchart illustrating an exemplary time mode/unrecorded mode determination process according to Example 4 of the present invention.
Figure 19:
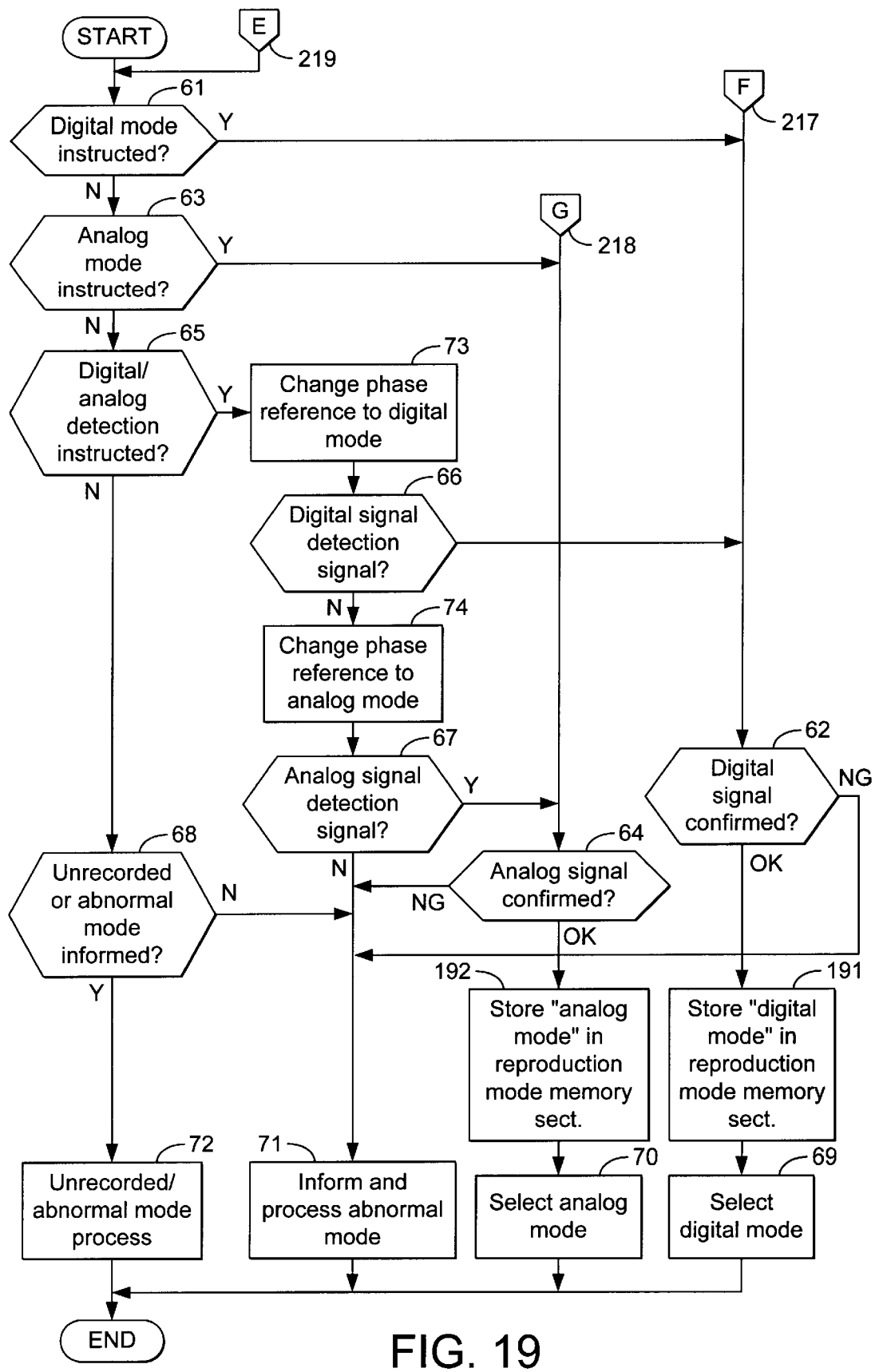
FIG. 19 is a flowchart illustrating an exemplary digital/analog determination process according to Example 4 of the present invention.

FIGS. 18 and 19 are flowcharts illustrating exemplary processes performed by the time mode/unrecorded mode determination section 12 and the digital/analog detection section 18, respectively, according to the present example. The time mode/unrecorded mode determination process shown in FIG. 18 is identical to the process shown in FIG. 2 (Example 1) except that, after a time mode is detected at step 32, 34 or 36 in FIG. 18, the time mode/unrecorded mode determination section 12 outputs the detected time mode so that the detected time mode is stored in the time mode memory section 171 at step 181, 182, or 183. Since the other steps are similar to those described with reference to FIG. 2, the description thereof is omitted.

The digital/analog determination process in FIG. 19 is identical to the process described with reference to FIG. 15 except that after a digital signal is confirmed at step 62, the digital/analog detection section 18 outputs the detected reproduction mode information so that the detected reproduction mode (digital mode) is stored in a reproduction mode memory section 172 at step 191, and that after an analog signal is confirmed at step 64, the digital/analog detection section 18 outputs the detected reproduction mode information so that the detected reproduction mode (analog mode) is stored in a reproduction mode memory section 172 at step 192. As a result, when the digital signal recorded region 151 is being scanned, "LP mode" is stored in the time mode memory section 171 and "digital mode" is stored in the reproduction mode memory section 172. When the subsequent unrecorded region is reached, the unrecorded state is recognized and the unrecorded mode process is performed, with the information "LP mode" and "digital mode" being still retained in the time mode memory section 171 and the reproduction mode memory section 172.

Figure 20:
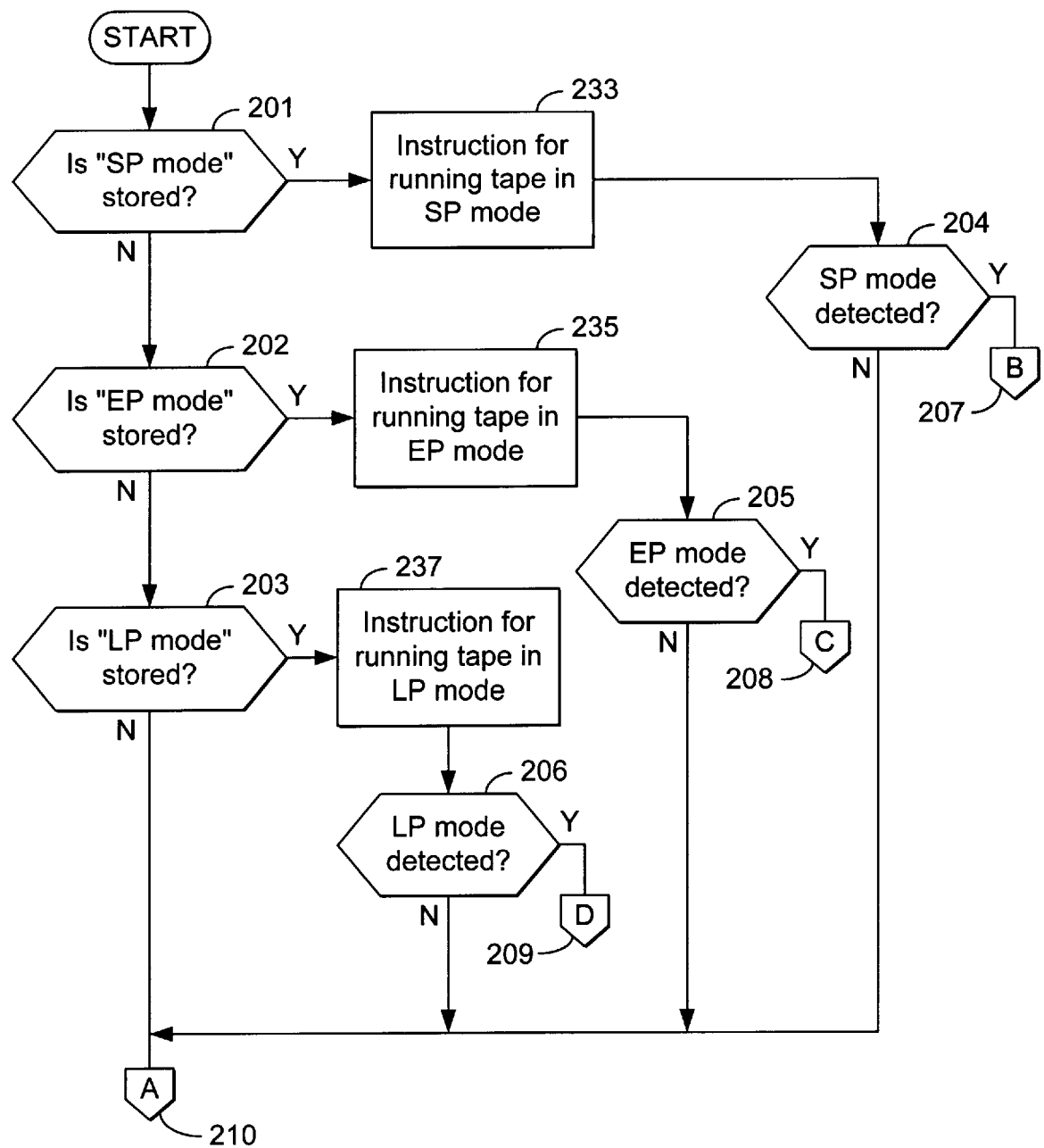
FIG. 20 is a flowchart illustrating an exemplary process of determining a time mode with respect to the stored time mode information according to Example 4 of the present invention.
Figure 21:
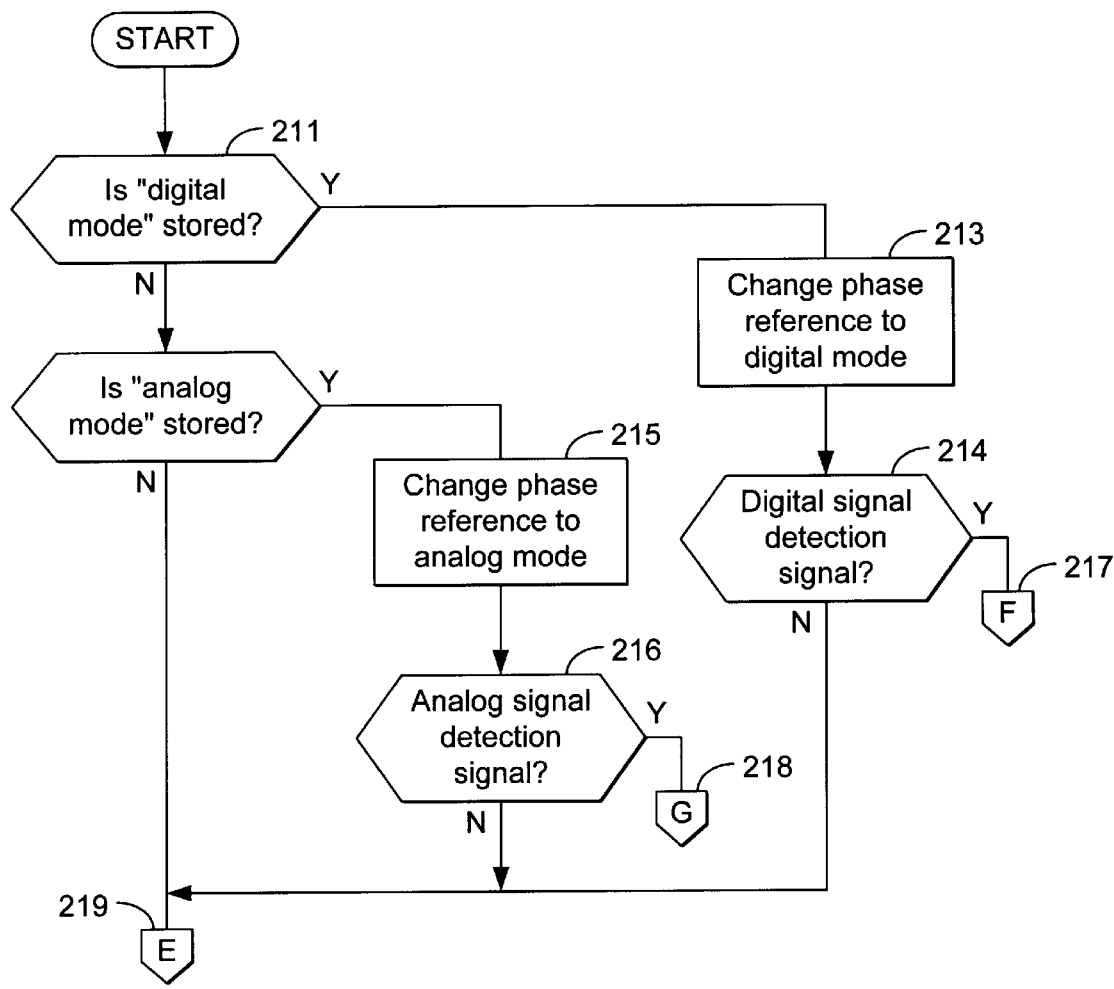
FIG. 21 is a flowchart illustrating an exemplary process of determining a reproduction mode with respect to the reproduction mode information according to Example 4 of the present invention.

Next, the process when the subsequent digital signal recorded region 153 is reached is described with reference to FIGS. 20 and 21. As the digital signal recorded region 153 is reached, the time mode/unrecorded mode determination section 12 first detects the end of the unrecorded region based on a control signal, and then performs a detection with respect to the time mode stored in the time mode memory section 171 before performing a detection with respect to any other time mode. For example, if "LP mode" is stored in the time mode memory section 171, the process passes steps 201 and 202, and proceeds from step 203 to step 237. Since the run speed of the magnetic tape 1 while traveling in an unrecorded region is not necessarily the predetermined run speed for the LP mode, the time mode/unrecorded mode determination section 12 issues at step 237 an instruction to the tape run control section 13 for running the magnetic tape 1 at the run speed for the LP mode. Then the process proceeds to step 206, where it is determined whether or not the LP mode is detected. If the LP mode is detected, the control proceeds to step 209 to perform a process identical to the process performed in the case where the LP mode is detected in FIG. 18. If the LP mode is not detected at step 206, the process proceeds to step 210 to perform the usual time mode detection process. However, it is not necessary to perform a determination as to whether or not the current time mode is the time mode stored in the time mode memory section 171 (i.e., the LP mode in the exemplary case).

If the result of the detection indicates a time mode which allows both digital signals and analog signals to be recorded/reproduced, an instruction for a digital/analog detection is issued to the digital/analog detection section 18. The digital/analog detection section 18 performs a digital/analog detection with respect to the reproduction mode stored in the reproduction mode memory section 172 before performing a detection with respect to any other reproduction mode. For example, if "digital mode" is stored in the reproduction mode memory section 172, the process proceeds from step 211 to step 213, where the phase of the magnetic tape 1 is set to the phase appropriate for the digital mode, and it is determined whether or not the digital mode is detected at step 214. It is also possible to run the magnetic tape 1 in accordance with the phase appropriate for the reproduction mode stored in the reproduction mode memory section 172 when it is run in accordance with the time mode stored in the time mode memory section 171. If the digital mode is detected, the process proceeds to step 217 to perform the digital mode process described in FIG. 19. If the digital mode is not detected at step 214, the process proceeds to step 219 to perform the usual reproduction mode detection process.

Similar processes are performed in the case where the information stored in the time mode memory section 171 indicates "SP mode" or "EP mode", and/or where the information stored in the reproduction mode memory section 172 indicates "analog mode", so that a detection is performed with respect to the stored modes first.

As described above, by storing the time mode and the reproduction mode which were taken in a region immediately preceding an unrecorded region and performing a detection process in a signal recorded region following the unrecorded region with respect to the stored time mode and the reproduction mode first, the mode determination can be performed in a shorter time. The same principle can also be applied to the case where an analog signal recorded region, an unrecorded region, and an analog signal recorded region are present on the magnetic tape 1 in this order.

It will be appreciated that the detection can be made with respect to only either one of the reproduction mode or the time mode first. For example, in the case where more than one time mode allows digital signals to be recorded/reproduced and a signal recorded region in a time mode that allows both digital and analog signals to be recorded/reproduced follows an unrecorded region, the most plausible reproduction mode can be quickly detected by performing a detection with respect to the reproduction mode taken immediately before an unrecorded region (i.e., the digital mode) first, even if the time mode may be different from the time mode immediately before the unrecorded region.

By retaining the reproduction mode (which governs the phase of the magnetic tape 1) of a region immediately before an unrecorded region while scanning the unrecorded region, it becomes unnecessary to change the phase of the magnetic tape 1 as long as the reproduction mode does not change before and after the unrecorded region, thereby further reducing the detection time in a signal recorded region following the unrecorded region. The same principle can also be applied to the time modes to reduce the detection time.

By running the magnetic tape 1 in the fastest mode among all the existing time modes in an unrecorded region independent of the time mode immediately before the unrecorded region, it becomes possible to quickly skip the unrecorded region. It is also applicable to run the magnetic tape 1 more quickly, e.g., at double speed or triple speed.

When the magnetic heads begin to scan the digital signal recorded region 153 following the unrecorded region 152 according to the present example, the time mode/unrecorded mode determination section 12 issues an instruction to the tape run control section 13 for running the magnetic tape 1 at a run speed for the time mode stored in the time mode memory section 171 at step 233, 235, or 237 before the time mode detection is performed at step 204, 205, or 206. However, it is also applicable to first detect the time mode while retaining the run speed at the unrecorded region 152, detect the same time mode as that stored in the time mode memory section 171, and thereafter issue an instruction for running the magnetic tape 1 at the run speed for that time mode.

The principle of the present example of performing a digital/analog determination and/or a time mode determination with respect to the reproduction mode and/or the time mode taken immediately before an unrecorded region is applicable to Examples 1, 2, and 3.

As described above, by storing the time mode and/or the reproduction mode which were taken immediately before an unrecorded region and performing a detection in a signal recorded region following the unrecorded region with respect to the stored time mode and/or the reproduction mode first, the mode determination can be performed in a shorter time.

EXAMPLE 5

Hereinafter, a reproduction apparatus according to Example 5 of the present invention is described with reference to the accompanying figures.

Figure 22:
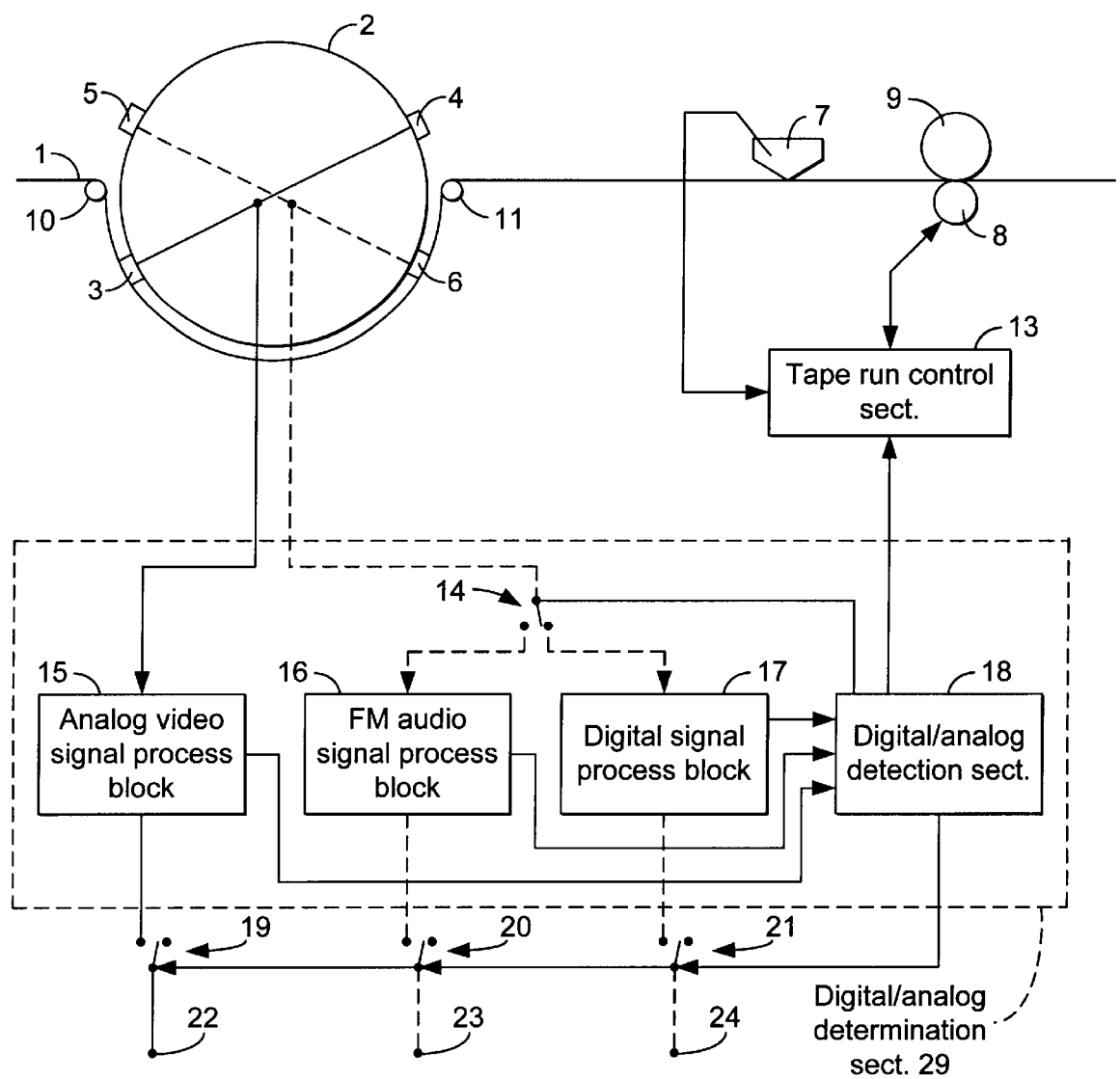
FIG. 22 is a block diagram illustrating a reproduction apparatus according to Example 5 of the present invention.

FIG. 22 is a block diagram illustrating a reproduction apparatus according to the present example. The reproduction apparatus according to the present example is identical to the reproduction apparatus of Example 1 except that the time mode/unrecorded mode determination section 12 is not included. The other blocks are identical to those in Example 1, and the description thereof are omitted. The present example illustrates a case where a digital/analog determination is performed by running the magnetic tape 1 at a speed in accordance with a mode other than the time modes which allow digital signals to be recorded/reproduced.

Figure 23A:
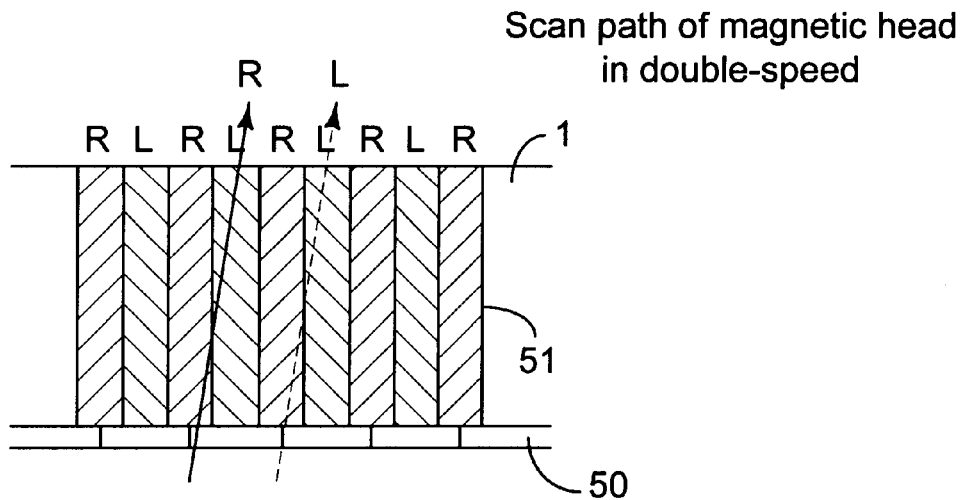
FIGS. 23A and 23B illustrate scan paths of magnetic heads according to Example 5 of the present invention.

FIG. 23A illustrates a case where the run speed of the magnetic tape 1 during the digital/analog detection is increased to be twice as high as the run speed of the time mode for recording a digital signal on the magnetic tape 1. The digital/analog determination section 18 issues an instruction to the tape run control section 13 for compulsorily running the magnetic tape 1 at a speed twice as high as the run speed for recording a digital signal on the magnetic tape 1. It will be appreciated that no autotracking is performed at this time. The magnetic tape 1 is run at a desired speed by the capstan motor 8 and the pinch roller 9, and the rotation cylinder 2 is rotated at a predetermined rotation speed. As a result, the respective magnetic heads scan the magnetic tape 1 in the directions indicated by the arrows in FIG. 23A. At this time, each magnetic head scans on substantially half of a track having the R azimuth angle and substantially half of a track having the L azimuth angle in one scan, so that the tracks having the same azimuth angles as those of the magnetic heads provide sufficient output power (reproduced signals).

Each track carrying a digital signal recorded thereon includes a plurality of sync blocks; each sync block includes a number of data units with a synchronization signal added. Thus, even if a part of a track is scanned by a magnetic head, at least the data of sync blocks corresponding to the scanned portion of the track can be read. A digital signal detection signal can be sufficiently obtained by inputting the output (reproduction signal) of the magnetic head to a digital signal detection signal generation section in the digital signal process block 17. That is, the digital signal detection signal generation section determines that a digital signal is recorded on the magnetic tape 1 if a periodic synchronization signal is stably obtained in a period which is substantially half the length of one scan. (If such a synchronization signal is not detected, the digital signal detection signal generation section determines that an analog signal is recorded on the magnetic tape 1.) Thus, the digital signal detection section generation section outputs a digital signal detection signal to the digital/analog detection section 18. By thus running the magnetic tape 1 at a speed substantially twice as high as the run speed for recording a digital signal, a digital/analog detection can be made by one scan without controlling the phase of the magnetic tape 1, thereby resulting in a quick detection.

The present example assumes that only one time mode allows digital signals to be recorded. However, the same effect can be obtained even in the case where more than one time mode allows digital signals to be recorded by performing a digital/analog determination while running the magnetic tape 1 at a speed substantially twice as high as the run speed of the time mode whose run speed of the magnetic tape 1 is the highest among such time modes.

Instead of running the magnetic tape 1 at a speed substantially twice as high as the run speed for recording a digital signal, it is also applicable to run the magnetic tape 1 at a speed of any time mode which does not allow digital signals to be reproduced. In this case, the detection may take some time due to the increased possibility of scanning on tracks having the wrong azimuth angle (i.e., the R-azimuth magnetic head scanning a L track, or the L-azimuth magnetic head scanning an R track), but a digital/analog determination can be made without controlling the phase of the magnetic tape 1.

Figure 23B:
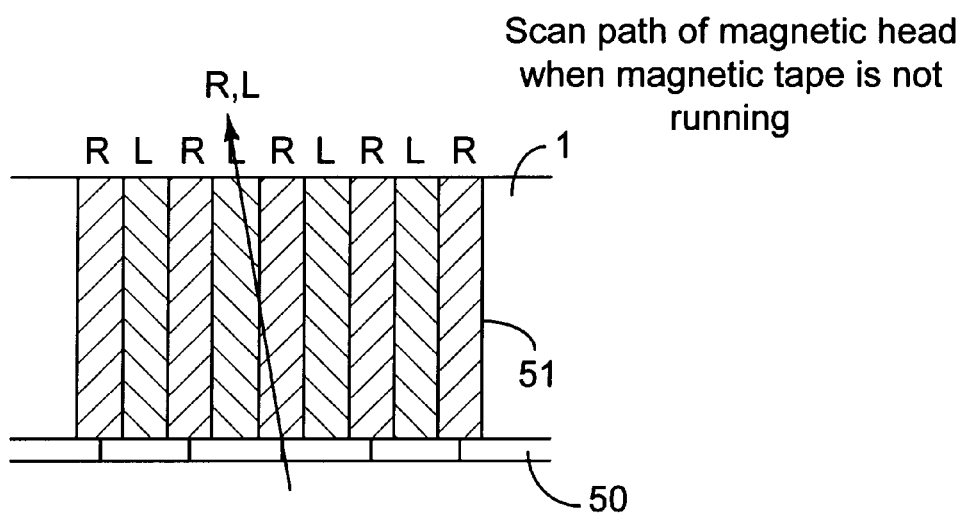

FIG. 23B illustrates another exemplary case where the running of the magnetic tape 1 is stopped when performing a digital/analog detection. The digital/analog determination section 18 issues an instruction to the tape run control section 13 for stopping the magnetic tape 1. In this case, both the R-azimuth magnetic head and the L-azimuth magnetic head follow the same scan path indicated by the arrow in FIG. 23B. As a result, each magnetic head scans on substantially half of a track having the R azimuth angle and substantially half a track having the L azimuth angle in one scan, so that the tracks having the same azimuth angles as those of the magnetic heads provide sufficient output power (reproduced signals). A digital signal detection signal can be sufficiently obtained by inputting the output (reproduced signal) of the magnetic head to a digital signal detection signal generation section in the digital signal process block 17. Thus, a periodic synchronization signal is obtained in a period which is substantially half the length of one scan of each head if a digital signal is recorded on the magnetic tape 1, whereby it is determined that a digital signal is recorded on the magnetic tape 1.

By thus stopping the magnetic tape 1, the digital/analog detection can be performed by one scan without controlling the phase of the magnetic tape 1. Therefore, not only is the determination quick, but also the magnetic tape 1 does not travel during the detection, so that the user can start playback at a desired position rather than at an unpredictable distance later. Especially when inserting the cassette tape into the reproduction apparatus, it is possible to perform a digital/analog determination while the magnetic tape 1 is stopped, preceding the determination of the time mode/unrecorded mode. As a result, it becomes possible to reduce the time required before the reproduced image/sound can be output.

Although the present example performs the determination as to whether the signal recorded on the magnetic tape 1 is a digital signal or analog signal based on the digital signal detection signal, the same effect can be attained also by generating an analog signal detection signal by detecting the H Sync in the analog signal and performing a digital/analog detection using the analog signal detection signal. Furthermore, the same effect can also be attained by using both the digital signal detection signal and the analog signal detection signal.

The digital signal detection signal in the present example is generated under the condition that a periodic synchronization signal is obtained in a period which is substantially half the length of one scan of each head. However, a periodic synchronization signal can also be reproduced in a period longer than a half of the length of one scan of each head by using a magnetic head having a gap width larger than the track pitch, for example. In other cases, a stable periodic synchronization signal can be reproduced only if a magnetic head is on the track in a region larger than half of the gap width of the magnetic head, so that a periodic synchronization signal is reproduced only in a period shorter than a half of the length of one scan of each head. In other words, the threshold period length of a "periodic" synchronization signal for regarding the digital signal detection signal as valid can be prescribed in accordance with the characteristics of the magnetic tape, magnetic heads, playback amplifier, etc. The same applies to the case where the analog signal detection signal is employed.

It will be appreciated that the method described in the present example can be applied in combination with the methods described in Example 1, 2, 3, or 4. Applied to Example 3, where the phase of the control signal recorded in the linear region 50 differs by 180° depending on whether an FM audio signal or a digital signal is recorded, there is no need to change the phase reference of the control signal during the digital/analog detection, thereby achieving a quick digital/analog determination.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reproduction apparatus comprising:
   a signal reading section for reading a signal recorded on magnetic tape, the signal including a digital signal and an analog signal;
   a control signal reading section for reading a control signal recorded on the magnetic tape and including information representing a time mode indicating a run speed of the magnetic tape;
   a first determination section for determining the time mode based on an output of the control signal reading section; and
   a second determination section for determining whether the signal read by the signal reading section is a digital signal or an analog signal after the time mode is determined by the first determination section, wherein the magnetic tape is run in the time mode determined by said first determination section, and a digital/analog determination is made based on a reproduced signal from one pair of magnetic heads.

2. A reproduction apparatus according to claim 1 further comprising an unrecorded mode determination section for determining whether or not the signal is recorded on the magnetic tape based on the output of the control signal reading section, wherein the output indicates whether or not the control signal is detected.

3. A reproduction apparatus according to claim 1, wherein the second determination section includes a digital signal detection section for outputting a digital signal detection signal when detecting that the signal read by the signal reading section is a digital signal.

4. A reproduction apparatus according to claim 3, wherein the digital signal detection section keeps operating regardless of whether the signal read by the signal reading section is a digital signal or an analog signal.

5. A reproduction apparatus according to claim 1, wherein the second determination section includes an analog signal detection suction for outputting an analog signal detection signal when detecting that the signal read by the signal reading section is an analog signal.

6. A reproduction apparatus according to claim 5, wherein the analog signal detection section keeps operating regardless of whether the signal read by the signal reading section is a digital signal or an analog signal.

7. A reproduction apparatus according to claim 1, wherein the second determination section includes:
   a digital signal detection section for outputting a digital signal detection signal when detecting that the signal read by the signal reading section is a digital signal; and
   an analog signal detection section for outputting an analog signal detection signal when detecting that the signal read by the signal reading section is an analog signal.

8. A reproduction apparatus according to claim 2, wherein the magnetic tape includes a digital signal recorded region in which the digital signal is recorded, and at least one region of an analog signal recorded region in which the analog signal is recorded and an unrecorded region in which the signal is not recorded, the control signal including information representing only one time mode for the digital signal, and
   the second determination section determines, when a region read by the control signal reading section proceeds from a first region to a second region, whether or not the signal read by the signal reading section is the analog signal based on the control signal read in the second region, the first region being the digital signal recorded region and the second region being different from the first region.

9. A reproduction apparatus according to claim 2, wherein the magnetic tape includes a digital signal recorded region in which the digital signal is recorded, and at least one region of an analog signal recorded region in which the analog signal is recorded and an unrecorded region in which the signal is not recorded, the control signal including information representing only one time mode for the analog signal, and
   the second determination section determines, when a region read by the control signal reading section proceeds from a first region to a second region, whether or not the signal read by the signal reading section is the digital signal based on the control signal read in the second region, the first region being the analog signal recorded region and the second region being different from the first region.

10. A reproduction apparatus according to claim 1, wherein the control signal includes exclusive time mode information indicating a time mode for reproducing either the digital signal or the analog signal;
   the first determination section outputs the time mode information to the second determination section; and the second determination section determines whether the signal read by the signal reading section is a digital signal or an analog signal based on the exclusive time mode information when the time mode information received from the first determination section is the exclusive time mode information.

11. A reproduction apparatus according to claim 7, wherein the digital signal detection section includes:
    an error correction code decoding section for decoding an error correction code of the signal read by the signal reading section and outputting an error flag indicating a read error; and
    an error flag detection section for outputting the digital signal detection signal when detecting that the signal read by the signal reading section is a digital signal according to the error flag.

12. A reproduction apparatus according to claim 7, wherein the digital signal detection section includes:
    a channel decoding section for decoding the signal read by the signal reading section and outputting a decoded signal; and
    a synchronization signal detection section for outputting the digital signal detection signal when detecting that the signal read by the signal reading section is a digital signal by detecting a synchronization signal included in the decoded signal.

13. A reproduction apparatus according to claim 7, wherein the analog signal detection section outputs the analog signal detection signal by detecting a level of a reproduction envelope of the signal read by the signal reading section.

14. A reproduction apparatus according to claim 7, wherein the analog signal detection section includes an analog video signal detection section for outputting the analog signal detection signal when detecting that the signal read by the signal reading section is an analog video signal.

15. A reproduction apparatus according to claim 14, wherein the analog video signal detection section outputs the analog signal detection signal by detecting a level of an envelope of the signal read by the signal reading section in the case where the signal is the analog video signal.

16. A reproduction apparatus according to claim 7, wherein the analog signal detection section includes an analog audio signal detection section for outputting the analog signal detection signal when detecting that the signal read by the signal reading section is an analog audio signal.

17. A reproduction apparatus according to claim 16, wherein the analog audio signal detection section outputs the analog signal detection signal by detecting a level of an envelope of the signal read by the signal reading section in the case where the signal is the analog audio signal.

18. A reproduction apparatus according to claim 7, wherein the analog signal includes an analog video signal and an analog audio signal, and
    the signal reading section includes a first magnetic head for reading the analog video signal, a second magnetic head for reading the analog audio signal, and a third magnetic head for reading the digital signal, the second magnetic head and the third magnetic head being the same magnetic head.

19. A reproduction apparatus according to claim 1, wherein the signal reading section includes a plurality of magnetic heads having different gap widths for reading the signal corresponding to the respective ones of the plurality of time modes, and
    the second determination section determines whether the signal read by the signal reading section is a digital signal or an analog signal based on the signal which is read by one of the plurality of magnetic heads having the largest gap width.

20. A reproduction apparatus according to claim 2, wherein the magnetic tape includes a first signal recorded region in which the signal is recorded, an unrecorded region in which the signal is not recorded, and a second signal recorded region, the unrecorded region adjoining the first signal recorded region and the second signal recorded region adjoining the unrecorded region,
    wherein the reproduction apparatus further comprises a reproduction mode memory section for storing a result of reproduction mode determination by the second determination section as to whether the signal read by the signal reading section is a digital signal or an analog signal, the unrecorded mode determination section outputting a result of determination as to whether the signal is recorded on the recording medium to the second determination section, and
    wherein the second determination section stores the result of the reproduction mode determination in the reproduction mode memory section when the signal reading section reads the signal in the first signal recorded region and the result output from the unrecorded mode determination section indicates that the signal is recorded on the recording medium;
    the second determination section retains without updating the result of the reproduction mode determination stored in the reproduction mode memory section when a region read by the signal reading section proceeds from the first signal recorded region to the unrecorded region and the result output from the unrecorded mode determination section indicates that the signal is not recorded on the recording medium; and
    the second determination section determines whether the signal read from the second signal recorded region is in a reproduction mode identical to the result of the reproduction mode determination stored in the reproduction mode memory section when the region read by the signal reading section proceeds from the unrecorded region to the second signal recorded region and the result output from the unrecorded mode determination section indicates that the signal is recorded on the recording medium.

21. A reproduction apparatus according to claim 2, wherein the magnetic tape includes a first signal recorded region in which the signal is recorded, an unrecorded region in which the signal is not recorded, and a second signal recorded region, the unrecorded region adjoining the first signal recorded region and the second signal recorded region adjoining the unrecorded region,
    wherein the reproduction apparatus further comprises a time mode memory section for storing a result of the time mode determination by the first determination section, the unrecorded mode determination section outputting the result of determination as to whether the signal is recorded on the recording medium to the first determination section, and
    wherein the first determination section stores the result of the time mode determination in the time mode memory section when the signal reading section reads the signal in the first signal recorded region and the result output from the unrecorded mode determination section indicates that the signal is recorded on the recording medium;
    the first determination section retains without updating the result of the time mode determination stored in the time mode memory section when a region read by the signal reading section proceeds from the first signal recorded region to the unrecorded region and the result output from the unrecorded mode determination section indicates that the signal is not recorded on the recording medium; and the first determination section determines whether the signal read from the second signal recorded region is in a time mode identical to the result of the time mode determination stored in the time mode memory section when the region read by the signal reading section proceeds from the unrecorded region to the second signal recorded region and the result output from the unrecorded mode determination section indicates that the signal is recorded on the recording medium.

22. A reproduction apparatus comprising:

a signal reading section for reading a signal recorded in tracks formed on a magnetic tape, the signal including a digital signal and an analog signal;

a control signal reading section for reading, simultaneously with the reading of the signal, a control signal recorded on the magnetic tape and including information representing a time mode indicating a run speed of the magnetic tape;

an unrecorded mode determination section for determining whether or not the signal is recorded on the magnetic tape based on the output of the control signal reading section, wherein the output indicates whether or not the control signal is detected;

a first determination section for determining the time mode based on an output of the control signal reading section;

a second determination section for determining whether the signal read by the signal reading section is a digital signal or an analog signal after the time mode is determined by the first determination section, wherein the magnetic tape is run in the time mode determined by said first determination section, and a digital/analog determination is made based on a reproduced signal from one pair of magnetic heads; and a phase control section for controlling the running of the tape so that the signal retains a first phase relationship with the control signal when the signal is a digital signal and that the signal retains a second phase relationship with the control signal when the signal is an analog signal, the second phase relationship being different from the first phase relationship, the phase control section controlling the running of the tape so that the first phase relationship is attained prior to the determination by the second determination section as to whether or not the signal read by the signal reading section is a digital signal, and that the second phase relationship is attained prior to the determination by the second determination section as to whether or not the signal read by the signal reading section is an analog signal.

23. A reproduction apparatus comprising:

a signal reading section including a rotation cylinder having a magnetic head thereon for reading a signal recorded on a magnetic tape by scanning tracks obliquely formed on the magnetic tape, the signal including a digital signal and an analog signal;

a tape run speed control section for controlling a run speed of the magnetic tape; and a reproduction mode determination section for outputting an instruction to the tape run speed control section for running the magnetic tape at a tape run speed different from predetermined tape run speeds used for reading the digital signal or the analog signal and determining whether the signal read by the signal reading section is a digital signal or an analog signal, after running the magnetic tape at the run speed different from predetermined tape run speed used for reading the digital signal or the analog signal.

24. A reproduction apparatus according to claim 23, wherein the instruction output from the reproduction mode determination section to the tape run speed control section is for running the magnetic tape at a speed twice as high as a highest one of the predetermined tape run speeds used for reading the digital signal.

25. A reproduction apparatus comprising:

a signal reading section including a rotation cylinder having a magnetic head thereon for reading a signal recorded on a magnetic tape by scanning tracks obliquely formed on the magnetic tape, the signal including a digital signal and an analog signal;

a tape run speed control section for controlling the magnetic tape to run or stop; and a reproduction mode determination section for outputting an instruction to the tape run speed control section for stopping the magnetic tape and determining whether the signal recorded on the magnetic tape is a digital signal or an analog signal based on the signal read by the signal reading section, after stopping the magnetic tape.

* * * * *